United States Patent
McDaniel et al.

(10) Patent No.: US 12,202,914 B2
(45) Date of Patent: Jan. 21, 2025

(54) RAPID ACTIVATION PROCESS AND ACTIVATION TREATMENTS FOR CHROMIUM CATALYSTS FOR PRODUCING HIGH MELT INDEX POLYETHYLENES

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); William C. Ellis, Bartlesville, OK (US); Deloris R. Gagan, Ramona, OK (US); Ted H. Cymbaluk, Seabrook, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 646 days.

(21) Appl. No.: 17/480,025

(22) Filed: Sep. 20, 2021

(65) Prior Publication Data

US 2022/0017661 A1    Jan. 20, 2022

Related U.S. Application Data

(63) Continuation of application No. 16/577,423, filed on Sep. 20, 2019, now Pat. No. 11,149,098.

(Continued)

(51) Int. Cl.
*C08F 4/02* (2006.01)
*C08F 4/24* (2006.01)
(Continued)

(52) U.S. Cl.
CPC ............... *C08F 10/02* (2013.01); *C08F 4/24* (2013.01); *C08F 110/02* (2013.01); *C08F 4/025* (2013.01);
(Continued)

(58) Field of Classification Search
None
See application file for complete search history.

(56) References Cited

U.S. PATENT DOCUMENTS 2,368,301 A   1/1945   William
3,248,179 A   4/1966   Norwood
(Continued)

FOREIGN PATENT DOCUMENTS

EP   2322564 A1   5/2011
WO   2020068638 A1   4/2020

OTHER PUBLICATIONS

Millipore Corporation. Safety Data Sheet for Pentane Anhydrous DriSolv. 2014. (Year: 2014).*

(Continued)

*Primary Examiner* — Richard A. Huhn
(74) *Attorney, Agent, or Firm* — Eversheds Sutherland (US) LLP

(57) ABSTRACT

Processes for activating chromium polymerization catalysts, which can use lower maximum activation temperatures and shorter activation times than conventional activation methods, and provide polyethylenes with high melt indices, broader molecular weight distributions, and lower long chain branching content. The activation process can comprise heating a supported chromium catalyst in an inert atmosphere to a first temperature ($T^1$) for a first hold time ($t^{H1}$), followed by allowing the chromium catalyst to attain a second temperature ($T^2$) in the inert atmosphere, then contacting the chromium catalyst with an oxidative atmosphere for a second hold time ($t^{H2}$), in which $T^2$ can be less than or equal to $T^1$. Additional activation treatments and conditioning steps are disclosed which can be used to enhance the melt index potential of Phillips (Cr/silica) catalysts.

21 Claims, 8 Drawing Sheets

Related U.S. Application Data

(60) Provisional application No. 62/735,999, filed on Sep. 25, 2018.

(51) Int. Cl.
*C08F 10/02* (2006.01)
*C08F 110/02* (2006.01)
*C08F 210/16* (2006.01)

(52) U.S. Cl.
CPC ........ *C08F 210/16* (2013.01); *C08F 2500/12* (2013.01)

(56) References Cited

U.S. PATENT DOCUMENTS

| | | | |
|---|---|---|---|
| 3,624,063 A | 11/1971 | Witt | |
| 3,976,632 A | 8/1976 | Delap | |
| 4,001,196 A | 1/1977 | Witt | |
| 4,147,849 A | 4/1979 | Liu | |
| 4,151,122 A | 4/1979 | McDaniel | |
| 4,177,162 A | 12/1979 | McDaniel | |
| 4,182,815 A | 1/1980 | McDaniel | |
| 4,188,471 A | 2/1980 | Nasser, Jr. | |
| 4,234,462 A | 11/1980 | Bondar | |
| 4,247,421 A | 1/1981 | McDaniel | |
| 4,248,735 A | 2/1981 | McDaniel | |
| 4,277,587 A | 7/1981 | McDaniel | |
| 4,295,998 A | 10/1981 | Hawley | |
| 4,297,460 A | 10/1981 | McDaniel | |
| 4,308,172 A | 12/1981 | McDaniel | |
| 4,331,789 A | 5/1982 | Hawley | |
| 4,333,860 A | 6/1982 | Hawley | |
| 4,357,451 A | 11/1982 | McDaniel | |
| 4,397,769 A | 8/1983 | McDaniel | |
| 4,424,341 A | 1/1984 | Hanson | |
| 4,460,756 A | 7/1984 | McDaniel | |
| 4,489,172 A | 12/1984 | McDaniel | |
| 4,501,885 A | 2/1985 | Sherk | |
| 4,559,394 A | 12/1985 | McDaniel | |
| 4,613,484 A | 9/1986 | Ayres | |
| 4,737,280 A | 4/1988 | Hanson | |
| 5,093,300 A | 3/1992 | Vogels | |
| 5,565,175 A | 10/1996 | Hottovy | |
| 5,597,892 A | 1/1997 | Hanson | |
| 6,239,235 B1 | 5/2001 | Hottovy | |
| 7,615,510 B2 | 11/2009 | McDaniel | |
| 7,803,736 B2 | 9/2010 | Rohde | |
| 7,981,832 B2 | 7/2011 | Mcdaniel | |
| 8,372,771 B2 | 2/2013 | Benham | |
| 9,006,363 B2 | 4/2015 | Moineau | |
| 9,376,511 B2 | 6/2016 | Mcdaniel | |
| 10,358,514 B2 | 7/2019 | Detournay | |
| 2009/0082197 A1* | 3/2009 | McDaniel | B01J 31/223 502/309 |

OTHER PUBLICATIONS

A. Noshay, et al., "Chemical Activation of Silica Supports for Chromocene-Based Polyethylene Catalysts," in Transition Metal Catalyzed Polymerization, Proc. Int. Symp., 2nd held in Akron, OH, 1986, (Quirk, R.P.) Cambridge Univ. Press, Cambridge, 1988, pp. 396-416.

Alfred Clark, et al., "Marlex Catalyst Systems," Industrial and Engineering Chemistry, vol. 48, No. 7, Jul. 1956, pp. 1152-1155.

Daniel Comnet, et al., "Chromium Compounds on Silica Gel," Journal of the American Chemical Society, 90:10, May 8, 1968, pp. 2489-2494.

E. Garrone, et al., "Coordination Chemistry of Silica Supported Cr Ions: Types of Cr(II) Ions on Reduced Samples," Olefin Metathesis and Polymerization Catalysts, NATO ASI Ser., Ser. C326, 1990, pp. 393-406.

F.E. Bailey Jr. (Ed.), "Initiation of Polymerization," A.C.S. Symposium Series 212, A.C.S. Symposium, Las Vegas, Paper 15—M.P. McDaniel, et al., "The Influence of Hydroxyls on the Cr/Silica Polymerization Catalyst," 1983, pp. 191-206.

International Search Report and Written Opinion issued in corresponding application PCT/US2019/052382, mailed Jan. 30, 2020, 10 pgs.

IUPAC Compendium of Chemical Terminology, 2nd Ed. (1997).

L.M. Baker, et al., "Bistriphenylsilyl Chromate. Oxidation of Olefins and Use in Ethylene Polymerization," The Journal of Organic Chemistry, vol. 35, No. 3, Mar. 1970, pp. 774-776.

M.P. McDaniel, "Surface Halides of Silica. 1. Chloride," Journal of Phys. Chem., American Chemical Society, vol. 85, 1981, pp. 532-537.

M.P. McDaniel, "Surface Halides of Silica. 2. Bromide and Iodide," Journal of Phys. Chem., American Chemical Society, vol. 85, 1981, pp. 537-541.

M.P. McDaniel, "Transition Metal Catalyzed Polymerizations," in: R.P. Quirk (Ed.), Alkenes and Dienes, vol. 4, MMI Press, Midland, MI, 1983, Part B—"The State of Cr on the Phillips Polymerization Catalyst," pp. 713-735.

M.P. McDaniel, et al., "The Activation of the Phillips Polymerization Catalyst: I. Influence of the Silanol Population," Org. Coat. Appl. Polym. Sci. Proc., vol. 46, pp. 708-713, 1981.

Max P. McDaniel, et al., "Excess Oxygen of Chromia, I," Journal of Catalysis, vol. 36, 1975, pp. 394-403.

Max P. McDaniel, et al., "Excess Oxygen of Chromia, II. Reaction Wit Diphenylpicrylhydrazine," Journal of Catalysis, vol. 36, 1975, pp. 404-412.

McDaniel, M. P., et al., Activation of Phillips Cr/silica catalysts IV. Mobility of Cr(VI), Journal of Catalysis, 2007, pp. 281-295, vol. 252, Academic Press, Inc.

P.J. Mangus, et al., "Temperature Programmed Sulfiding of Silica and Alumina Supported Chromiumoxide Catalysts," Bull. Soc. Chim. Belg., vol. 96, No. 11-12, 1987, pp. 977-983.

R.E. Hoff, et al., "Chromic Titanate Catalysts for High-Melt-Index Polyethylene by the Particle-Form Process," Journal of Applied Polymer Science, vol. 26, Issue 9, Sep. 1981, pp. 2927-2934.

Robert L. Burwell, et al., "Chemisorptive and Catalytic Behavior of Chromia," Adv. Catal., 20, 1969, pp. 1-96.

Welch, et al., "The Activation of the Phillips Polymerization Catalyst; I. Influence of the Hydroxyl Population", J Catalysis, vol. 82, No. 1, Jul. 1, 1983, pp. 98-109.

Welch, et al., "The Activation of the Phillips Polymerization Catalyst; II. Activation By Reduction-Reoxidation", J Catalysis, vol. 82, No. 1, Jul. 1, 1983, pp. 110-117.

Search Report issued in corresponding Russian Application No. 2021105372 mailed on Jan. 9, 2023, 2 pp.

* cited by examiner

RAPID ACTIVATION PROCESS AND ACTIVATION TREATMENTS FOR CHROMIUM CATALYSTS FOR PRODUCING HIGH MELT INDEX POLYETHYLENES

CROSS-REFERENCE TO RELATED APPLICATIONS

This application is a continuation of U.S. application Ser. No. 16/577,423, filed Sep. 20, 2019, which claims the benefit of priority of U.S. Provisional Patent Application No. 62/735,999, filed Sep. 25, 2018, each of which is incorporated herein by reference in its entirety.

TECHNICAL FIELD

This disclosure relates to supported chromium catalysts, methods for activating the chromium catalysts, and processes for forming polyethylene using the activated chromium catalysts.

BACKGROUND

Chromium catalysts are used extensively for polymerizing olefins, with the chromium oxides supported on silica, alumina, or similar supports being among the most prevalent catalysts for this process. One feature of supported chromium catalysts is the requirement to activate the catalysts prior to their use in any polymerization process.

Typical commercial activation processes include calcining or heating large quantities of the supported catalyst in dry air, often in a fluidized bed activator. These activation procedures often require heating the catalyst slowly to high activation temperatures, maintaining the activation temperature for an extended period of time, then cooling the catalyst for several hours before the catalyst is discharged from the activation vessel. The entire activation process can take from 24 to 36 hours, which can constitute a bottleneck in the overall polymerization process.

What are needed are improved activation processes that might decrease the overall activation cycle time, while still affording catalysts with the desired activity and resulting polymer properties. What are also needed are processes using chromium catalysts that can provide polymers with higher melt indices than provided by conventional chromium catalysts or chromium catalysts that are activated in a conventional manner. Such processes might allow activation at lower maximum temperatures and provide higher efficiencies and throughput for the activation process.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In an aspect, this disclosure provides new processes for activating supported chromium catalysts which can shorten the overall activation cycle time, and provide an activated catalyst that unexpectedly affords improved polyethylene properties as compared to the polyethylenes that are activated using conventional methods. The shorter activation times provided by the processes disclosed herein can result in activator debottlenecking and higher activator throughputs. In other aspects, lower maximum activation temperatures are possible using the disclosed methods, which can provide polyethylenes with improved physical properties such as broader molecular weight distributions or lower long chain branching (LCB) content. In some aspects, lower polymerization reactor temperatures can be used with the catalysts disclosed herein, which can result in decreased swelling, higher solids, and higher production rates and catalyst activities. In some aspects, higher ethylene concentrations can be used with the catalysts disclosed herein, which may afford higher productivity, lower catalyst costs, and improved polymer mechanical properties.

In some aspects, this disclosure provides a process for activating a supported chromium catalyst, the process comprising:

a) heating a supported chromium catalyst in an inert atmosphere to a first temperature ($T^1$) at a first ramp rate ($RR^1$);
b) holding the chromium catalyst at the first temperature in the inert atmosphere for a first hold time ($t^{H1}$);
c) allowing the chromium catalyst to attain a second temperature ($T^2$) in the inert atmosphere at a second ramp rate ($RR^2$), followed by exposing the chromium catalyst to an oxidative atmosphere;
d) holding the chromium catalyst at the second temperature in the oxidative atmosphere for a second hold time ($t^{H2}$); and
e) allowing the chromium catalyst to cool to a temperature below the second temperature in an inert atmosphere, in the oxidative atmosphere, or in any sequential combination of an inert atmosphere and an oxidative atmosphere over a cooling time ($t^C$), to provide an activated chromium catalyst.

In this aspect, the first temperature ($T^1$) can be greater than or equal to the second temperature ($T^2$), that is $T^2$ is less than or equal to $T^1$. For example, the first temperature ($T^1$) can be greater than the second temperature ($T^2$), and the step of allowing the chromium catalyst to attain the second temperature ($T^2$) in the inert atmosphere can be effected by allowing the chromium catalyst to cool under a flow of inert gas. In a further aspect, the first hold time ($t^{H1}$) can be greater than the second hold time ($t^{H2}$). Alternatively, the first hold time ($t^{H1}$) can be equal to the second hold time ($t^{H2}$).

According to a further aspect, with respect to steps a) through e) of the activation process disclosed above, if desired, step a) of heating the supported chromium catalyst to the first temperature ($T^1$) can be preceded by a conditioning step or conditioning process, the conditioning process comprising heating the supported chromium catalyst to a conditioning temperature ($T^C$) in an oxidative atmosphere at a conditioning ramp rate ($RR^C$), and holding the chromium catalyst at $T^C$ in the oxidative atmosphere for a conditioning time ($t^C$) to provide a conditioned chromium catalyst.

In a further aspect, the conditioning process can involve a cycling between an oxidative atmosphere and an inert atmosphere one or more times, which can burn off organic compounds on the catalyst. In this aspect, the "conditioning temperature" $T^C$ is considered the first temperature that the catalyst is heated to at the start of the cycling process. This aspect of the disclosure has been found to be useful for large scale commercial embodiments of the activation process. In aspect, for example, with respect to steps a) through e) of the activation process disclosed above, if desired, step a) of heating the supported chromium catalyst to the first temperature ($T^1$) can be preceded by a conditioning process, the conditioning process comprising:

a) heating the supported chromium catalyst to a conditioning temperature ($T^C$) in an inert atmosphere at a conditioning ramp rate ($RR^C$), and holding the chromium catalyst at $T^C$ in the inert atmosphere for a first conditioning time ($t^{C1}$);

b) exposing the supported chromium catalyst to an oxidative atmosphere for a second conditioning time ($t^{C2}$);

c) exposing the supported chromium catalyst to an inert atmosphere for a third conditioning time ($t^{C3}$); and d) repeating steps b) and c) between 0 and 15 times to provide a conditioned chromium catalyst.

In this aspect of conditioning the catalyst, the formal "conditioning temperature" $T^C$ can be considered as the first temperature to which the catalyst is heated at the start of the cycling process, although conditioning in this aspect actually occurs over a temperature range.

In yet another aspect, there is provided a process for polymerizing olefins using a supported chromium catalyst, the process comprising:

a) activating the supported chromium catalyst according to steps a) through e) of the process disclosed above to provide the activated chromium catalyst;

b) under polymerization conditions, contacting in a reaction zone the activated chromium catalyst with at least one $C_2$ to $C_8$ mono-1-olefin to form an olefin polymer.

While not intending to be bound by theory, it has been discovered that the olefin polymer prepared using the activated supported catalysts of this disclosure can have a melt index (MI) greater than the MI of a reference polyolefin, wherein the reference polyolefin is prepared under identical conditions as the olefin polymer using the disclosed catalysts, with the exception that a reference chromium catalyst is used in preparing the reference polyolefin, which is activated by:

i) heating the supported chromium catalyst in air to an activation temperature ($T^1$), for example, from about 600° C. to about 1000° C.) and holding the chromium catalyst at the activation temperature in air for 3 hours; and ii) allowing the chromium catalyst to cool below 700° F. (371° C.) in air, followed by purging to or at ambient temperature in an inert atmosphere to provide the activated reference chromium catalyst.

In accordance with further aspects, this disclosure provides non-conventional activation protocols and processes, which can be used to enhance the melt index potential of Phillips (Cr/silica) catalysts. For example, some activation processes have been discovered to produce polyethylenes using a Phillips catalyst having up to 30 melt index. The molecular weight (MW) distribution obtained in these processes can be narrow, for example, they can resembling Ziegler-derived injection molding resins. In addition to obtaining higher catalyst melt index potential, the activation treatments disclosed herein can also be used to improve a number of operation issues. In some aspects, for example, the disclosed processes can lower catalyst cost, improve resin color, lower gel-count, reduce swelling which allows higher solids, increase settling efficiency, control die swell, shorten the activation cycle, and improve polymer properties by lowering the activation temperature without a loss in MI.

In an aspect, there is provided a process for the pre-reactor reduction of Cr(VI) to Cr(II), that is, prior to charging the catalyst to the reactor. For example, it has been found that treatment of the catalyst in CO at about 350° C. can reduce the hexavalent chromium almost quantitatively to a divalent species. The CO-reduced catalysts usually exhibit short or no induction time and can produce a slightly narrowed molecular weight (MW) distribution, especially if the support contains titania. Higher melt index polyethylenes can be provided using this activation treatment.

In a further aspect, this disclosure provides processes for the anhydrous impregnation of chromium. Although conventional impregnation involves Cr(VI) attachment to silica by esterification with pairs of silanol groups on a fully hydrated surface, Cr(VI) has been found to attach through reactions with siloxanes under anhydrous conditions. The resulting catalysts can produce polyethylenes having very high melt indices (low MW), and if titania is present, the usual MI response can be enhanced even more.

In another aspect, there is provided a process for the enhanced surface dehydroxylation of the surface support used in the Phillips catalyst in either one-step or two-step activations processes. In one aspect, compounds containing carbon and sulfur, such as $CS_2$, COS, or $CH_3SH$, were found to be effective in the promotion of dihydroxylation, whereas sulfur compounds containing no carbon, such as S, $H_2S$ or $SO_2$, had no such effect. Higher melt index polyethylenes also can be obtained when using this activation treatment.

This summary and the following detailed description provide examples and are explanatory only of the invention. Accordingly, the foregoing summary and the following detailed description should not be considered to be restrictive. Additional features or variations thereof can be provided in addition to those set forth herein, such as for example, various feature combinations and sub-combinations of these described in the detailed description.

DETAILED DESCRIPTION OF THE DISCLOSURE

Figure 1:
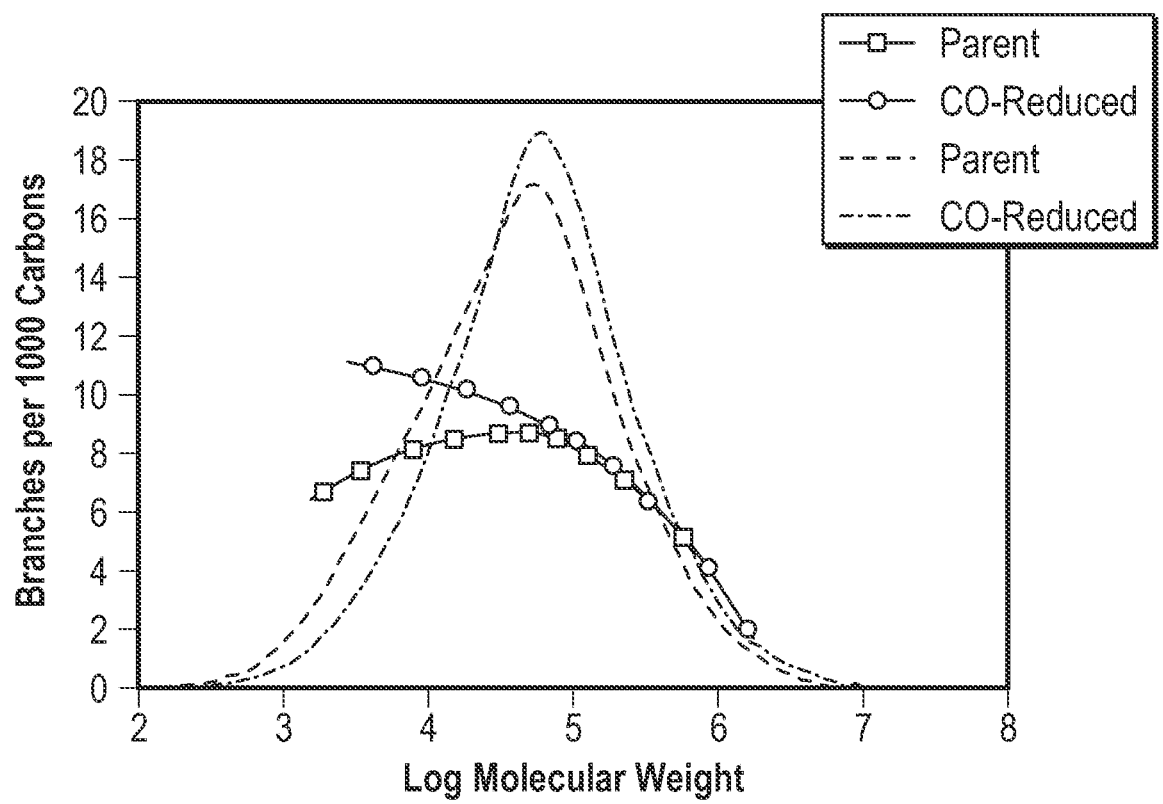
FIG. 1 illustrates a plot of MW (weight average molecular weight) versus the branch distribution of polymers from Cr/silica-titania (5% Ti) activated at 700° C. (parent) followed by CO at 350° C. (CO-reduced), at a reaction temperature at 95° C.

Definitions To define more clearly the terms used herein, the following definitions are provided.

Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and processes are described in terms of "comprising" various components or steps, the compositions and processes can also "consist essentially of" or "consist of" the various components or steps, unless stated otherwise.

The terms "a," "an," and "the" are intended to include plural alternatives, e.g., at least one. For instance, the disclosure of "a conditioning step," "a diluent," "a catalyst," and the like, is meant to encompass one or more than one step, diluent, catalyst, and the like. With respect to the compounds or compositions and unless otherwise specified, this disclosure is intended to encompass mixtures or combinations of more than one of the recited diluent, catalyst, and the like.

The terms "including", "with", and "having", as used herein, are defined as comprising (i.e., open language), unless specified otherwise.

For any particular compound or group disclosed herein, any name or structure presented is intended to encompass all conformational isomers, regioisomers, stereoisomers, and mixtures thereof that can arise from a particular set of substituents, unless otherwise specified. The name or structure also encompasses all enantiomers, diastereomers, and other optical isomers (if there are any) whether in enantiomeric or racemic forms, as well as mixtures of stereoisomers, as would be recognized by a skilled artisan, unless otherwise specified. For example, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The term "ambient" temperature as understood by the person of ordinary skill in the art means the temperature of the environment in which the process is conducted (not the process temperature), which can include room temperature which is from about 20° C. to about 25° C., or about 68° F. to about 77° F.).

Unless otherwise specified, reference to a molecular weight of a polymer which may be abbreviated MW, refers to the weight average molecular weight (also abbreviated $M_W$) of the polymer. The abbreviation MI refers to the melt index of the polymer.

Various numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. For example, by disclosing a temperature of from 70° C. to 80° C., Applicant's intent is to recite individually 70° C., 71° C., 72° C., 73° C., 74° C., 75° C., 76° C., 77° C., 78° C., 79° C., and 80° C., including any sub-ranges and combinations of sub-ranges encompassed therein, and these methods of describing such ranges are interchangeable. Moreover, all numerical end points of ranges disclosed herein are approximate, unless excluded by proviso. As a representative example, if Applicants state that one or more steps in the processes disclosed herein can be conducted at a temperature in a range from 10° C. to 75° C., this range should be interpreted as encompassing temperatures in a range from "about" 10° C. to "about" 75° C.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, or ±3% of the stated value.

Applicants reserve the right to proviso out or exclude any individual members of any such group of values or ranges, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference or prior disclosure that Applicants can be unaware of at the time of the filing of the application.

The terms "contact product," "contacting," and the like, are used herein to describe compositions and methods wherein the components are contacted together in any order, in any manner, and for any length of time, unless specified otherwise. For example, the components can be contacted by blending or mixing. Further, unless otherwise specified, the contacting of any component can occur in the presence or absence of any other component of the compositions and methods described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Similarly, "contacting" two or more components can result in a reaction product or a reaction mixture. Consequently, depending upon the circumstances, a "contact product" can be a mixture, a reaction mixture, or a reaction product.

Throughout this disclosure, reference is made to heating or cooling "ramp rates", such as a first ramp rate ($RR^1$) or a second ramp rate ($RR^2$). Ramp rates are expressed in degrees per unit time, such as ° C./minute or ° F./minute. In the event that the ramp rate is not a constant rate, then the ramp rate can refer to an average ramp rate over the heating or cooling time.

Although any methods and materials similar or equivalent to those described herein can be used in the practice or testing of the invention, the typical methods and materials are herein described.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Provided in this disclosure are processes for activating chromium polymerization catalysts, which can use lower maximum activation temperatures and shorter activation times than conventional activation methods, and provide polyethylenes with high melt indices, broader molecular weight distributions, and lower long chain branching content. Among other things, the processes comprise heating a supported chromium catalyst in an inert atmosphere to a first temperature ($T^1$) for a first hold time ($t^{H1}$), followed by allowing the chromium catalyst to attain a second temperature ($T^2$) in the inert atmosphere, then contacting the chromium catalyst with an oxidative atmosphere for a second hold time ($t^{H2}$), in which $T^1$ is greater than or equal to $T^2$.

Catalyst Activation Process

In an aspect, there is provided a process for activating a supported chromium catalyst, the process comprising:
 a) heating a supported chromium catalyst in an inert atmosphere to a first temperature ($T^1$) at a first ramp rate ($RR^1$);
 b) holding the chromium catalyst at the first temperature in the inert atmosphere for a first hold time ($t^{H1}$);
 c) allowing the chromium catalyst to attain a second temperature ($T^2$) in the inert atmosphere at a second ramp rate ($RR^2$), followed by exposing the chromium catalyst to an oxidative atmosphere;

d) holding the chromium catalyst at the second temperature in the oxidative atmosphere for a second hold time ($t^{H2}$); and e) allowing the chromium catalyst to cool to a temperature below the second temperature in an inert atmosphere, in the oxidative atmosphere, or in any sequential combination of an inert atmosphere and an oxidative atmosphere over a cooling time ($t^C$), to provide an activated chromium catalyst.

According to this aspect, the first temperature ($T^1$) can be greater than the second temperature ($T^2$), or the first temperature ($T^1$) can be equal to the second temperature ($T^2$). In an aspect for example, the first temperature ($T^1$) can be greater than the second temperature ($T^2$), and the step of allowing the chromium catalyst to attain the second temperature ($T^2$) in the inert atmosphere or in the oxidative atmosphere can be carried out by allowing the chromium catalyst to cool under a flow of inert gas or under a flow of an oxidative atmosphere. In another aspect, step e) can comprise allowing the chromium catalyst to cool to a temperature below the second temperature in an inert atmosphere or in the oxidative atmosphere over a cooling time ($t^C$), to provide an activated chromium catalyst.

An inert atmosphere used in the disclosed processes can comprise, consist of, or can be selected from carbon dioxide ($CO_2$), helium, argon, nitrogen, or any combination of these recited gases, and can also be a vacuum. However, an inert atmosphere is not limited to these gases or conditions (vacuum) and can further include other gases that do not oxidize the chromium to Cr(VI) under the conditions recited. In an aspect, the disclosed process can be carried out in a fluidized bed which can provide consistent exposure of the supported catalyst particles to the activation conditions.

An oxidizing atmosphere used in the disclosed processes can comprise, consist of, or can be selected from pure oxygen or ambient air containing oxygen, or a combination or mixture of air and nitrogen, or a combination of mixture of oxygen and nitrogen, but an oxidizing atmosphere is not limited to these gases. Anhydrous or dry air or oxygen can be used. For example, the oxidative atmosphere can comprise air or oxygen having a dew point of less than about −40° C., less than about −50° C., less than about −60° C., less than about −70° C., or less than about −80° C., for example about −82° C. (−116° F.). The oxidizing atmosphere includes a gas containing from about 5 vol % (volume percent) to about 100 vol % of oxygen. Alternatively an oxidizing atmosphere can include a gas containing from about 10 vol % to about 50 vol % of oxygen, or from about 15 vol % to about 30 vol % of oxygen. For purposes of this disclosure, the term "air" refers to an oxidizing atmosphere. Other oxidizing compounds which can be used in an oxidizing atmosphere include, but are not limited to, nitrous oxide ($N_2O$), nitrogen dioxide ($NO_2$), nitric oxide (NO), oxygen containing halide compounds such as iodine pentoxide ($I_2O_5$) or chlorine monoxide ($Cl_2O$), and/or other materials which release oxygen, including suitable combinations thereof. Moreover, any of these oxidizing gases can be used in combination with or in a mixture with nitrogen. Contacting the supported chromium catalyst particles with the oxidizing atmosphere can also be carried out in a fluidized bed which can provide consistent exposure of the supported catalyst particles to the activation conditions.

In step a) of the process disclosed above, a supported chromium catalyst is heated in an inert atmosphere to a first temperature ($T^1$) at a first ramp rate ($RR^1$). In this aspect for example, $T^1$ can be from about 500° C. to about 1000° C., from about 550° C. to about 900° C., from about 600° C. to about 870° C., or from about 650° C. to about 850° C. Alternatively, $T^1$ can be for example about 500° C., about 525° C., about 550° C., about 575° C., about 600° C., about 625° C., about 650° C., about 675° C., about 700° C., about 725° C., about 750° C., about 775° C., about 800° C., about 825° C., about 850° C., about 875° C., about 900° C., about 925° C., about 950° C., about 975° C., or about 1000° C., or any range between any of these values.

Also in step a) of the process disclosed above, in an aspect, the first ramp rate ($RR^1$) can be for example greater than about 0.5° C./minute, greater than about 1.0° C./minute, greater than about 1.5° C./minute, or greater than about 1.8° C./minute, and wherein the upper limit of the first ramp rate in each occurrence is about 5° C./minute. Alternatively, the first ramp rate ($RR^1$) can be for example about 1° C./minute, about 1.25° C./minute, about 1.35° C./minute, about 1.5° C./minute, about 1.8° C./minute, or about 2° C./minute, or any range between any of these values.

In step b) of the process disclosed above, once the supported chromium catalyst is heated in the inert atmosphere to a first temperature ($T^1$), the chromium catalyst can be held at the first temperature in the inert atmosphere for a first hold time ($t^{H1}$). In an aspect, the first hold time ($t^{H1}$) can be for example less than about 15 hours, less than about 10 hours, less than about 6 hours, less than about 5 hours, less than about 4 hours, or less than about 3 hours, and wherein the lower limit of $t^{H1}$ in each occurrence is about 15 minutes. Alternatively, the first hold time ($t^{H1}$) can be for example about 15 hours, about 12 hours, about 10 hours, about 6 hours, about 5 hours, about 4 hours, about 3 hours, or about 2 hours, or any range between any of these values.

In step c) of the process disclosed above, once the heated supported chromium catalyst held at the first temperature in the inert atmosphere for a first hold time ($t^{H1}$), then the chromium catalyst is allowed to attain a second temperature ($T^2$) in the inert atmosphere at a second ramp rate ($RR^2$), followed by exposing the chromium catalyst to an oxidative atmosphere. When referring to allowing the chromium catalyst to attain a second temperature ($T^2$), it is generally intended to reflect that heating is either discontinued or less heat is applied than was used to bring the catalyst to the first temperature, and the heated catalyst is allowed to lose heat to the system and the environment. Therefore, the second ramp rate $RR^2$ can reflect the rate at which the heated catalyst will naturally lose heat to the environment by continuing the same inert gas flow, but simply reducing the heat input, for example by turning off some or all heating to the catalyst and vessel. For example, allowing the chromium catalyst to attain the second temperature $T^2$ can be accomplished by continuing flow of the inert gas while discontinuing heating, and allowing the heated catalyst to slowly cool. Once the catalyst attains the desired second temperature ($T^2$), the catalyst can then be exposed to an oxidative atmosphere.

In an aspect, the second temperature $T^2$ can be less than or equal to the first temperature $T^1$. For example, in some aspects $T^2$ can be determined by the formula $T^2$ (° C.)=$T^1$ (° C.)−K (° C.), and wherein K can be selected from, for example, about 0° C., about 25° C., about 50° C., about 100° C., about 150° C., or about 200° C., or any range between any of these values. Alternatively, when $T^2$ (° C.)=$T^1$ (° C.)−K (° C.), K can be selected from greater than or equal to 25° C., greater than or equal to 50° C., greater than or equal to 100° C., greater than or equal to 150° C., or greater than or equal to 200° C., and wherein the upper limit of K is about 350° C., about 400° C., about 450° C., or about 500° C. That is, $T^2$ can be in a range of from about 25° C. lower than $T^1$ to about 500° C. lower than $T^1$, and ranges in between any of these recited values.

In step d) of the process disclosed above, once the catalyst is allowed to attain the second temperature ($T^2$) in the inert atmosphere and then exposed to an oxidative temperature, the chromium catalyst can be held at the second temperature in the oxidative atmosphere for a second hold time ($t^{H2}$). In an aspect, for example, the second hold time ($t^{H2}$) can be less than 3 hours, less than 2 hours, less than 1 hour, less than 30 minutes, less than 15 minutes, less than 10 minutes, less than 5 minutes, or less than 1 minute, and wherein the lower limit of $t^{H2}$ in each occurrence is about 30 seconds. In a further aspect, the second hold time ($t^{H2}$) can be for example about 1 hour, about 45 minutes, about 30 minutes, about 15 minutes, about 10 minutes, about 5 minutes, about 2 minutes, or about 30 seconds, or any range between any of these values.

In step e) of the process disclosed above, after holding the chromium catalyst at the second temperature in the oxidative atmosphere for a second hold time ($t^{H2}$), the chromium catalyst is then allowed to cool to a temperature below the second temperature, either in an oxidative atmosphere such as the oxidative atmosphere used in step d), or alternatively, in an inert atmosphere, over a cooling time ($t^C$), or alternatively in any sequential combination of an inert atmosphere and an oxidative atmosphere (which can start with either an inert atmosphere or oxidative atmosphere) over a cooling time ($t^C$), to provide an activated chromium catalyst. In an aspect for example, the cooling time ($t^C$) can be for example less than 6 hours, less than 4 hours, less than 3.5 hours, less than 3 hours, less than 1 hour, less than 30 minutes, or less than 5 minutes, and wherein the lower limit of $t^C$ in each occurrence is about 30 seconds. In a further aspect, the cooling time ($t^C$) can be about 4 hours, about 3.5 hours, about 3 hours, about 2.5 hour, about 2 hour, about 1.5 hour, about 1 hour, about 45 minutes, about 30 minutes, about 15 minutes, about 10 minutes, about 5 minutes, or about 1 minute, or any range between any of these values. Thus, cooling step e) can comprise allowing the chromium catalyst to cool to a temperature below the second temperature in a sequence of inert atmosphere followed by oxidative atmosphere, or a sequence of oxidative atmosphere followed by inert atmosphere over a cooling time ($t^C$), to provide an activated chromium catalyst. Both aspects of starting the cooling step e) with either an inert atmosphere or oxidative atmosphere are encompassed by specifying in any sequential combination of an inert atmosphere and an oxidative atmosphere.

In various aspects and embodiments, particularly large scale commercial embodiments, the activation steps following the hold time ($t^{H1}$) at the first temperature ($T^1$), which are "cooling" steps generally corresponding to steps c) through e) in the above process, the simple approach of $T^2$ (step c)) for a holding time $t^{H2}$ (step d)) followed by cooling in an inert atmosphere (step e)), can be replaced by the following cooling sequence. Specifically, in this aspect, the cooling sequence can constitute what can be termed a "moving" oxidation by allowing the catalyst to cool in an oxidative atmosphere such as air from a temperature of X° F. to a temperature of Y° F., and subsequently changing the atmosphere back to an inert atmosphere such as $N_2$. In this aspect, step b) of the process set out above can be followed immediately by this new moving oxidation cooling sequence. For example, in this "moving" oxidation step, the catalyst was allowed to cool in air or another oxidative atmosphere from a temperature of from X° F. to Y° F., followed by exposing the catalyst to an inert atmosphere such as nitrogen. In this aspect, the temperature X° F. can be less than or equal to the first temperature $T^1$. The temperature Y° F. can be less than X° F., and the temperature Y° F. can be from about 500° F. to about 800° F., or about 600° F. to about 700° F. Alternatively, the temperature Y° F. can be about 800° F., about 775° F., about 750° F., about 725° F., about 700° F., about 675° F., about 650° F., about 625° F., about 600° F., about 575° F., about 550° F., about 525° F., or about 500° F., or any range between these values. Also in this aspect, X° F. can be from about 1000° F. to about 1300° F., or about 1050° F. to about 1250° F. Alternatively, the temperature X° F. can be about 1000° F., about 1025° F., about 1050° F., about 1075° F., about 1100° F., about 1125° F., about 1150° F., about 1175° F., about 1200° F., about 1225° F., about 1250° F., about 1275° F., or about 1300° F., or any range between these values.

In a further aspect of this "moving" oxidation step, the cooling ramp rate can be from about 0.2° F./min to about 12° F./min, from about 0.5° F./min to about 10° C./min, from about 1° F./min to about 8° C./min, or from about 1.5° F./min to about 7° C./min. The cooling times in an oxidative atmosphere such as air from X° F. to Y° F. can be greater than 1min, greater than 5 min, greater than 15 min, greater than 30 min, greater than 1 h, greater than 2 h, or greater than 5 h. The cooling times in an oxidative atmosphere from X° F. to Y° F. can be less than 3 h, less than 2 h, less than 1.5 h, less than 1 h, or less than 30 min. This particular aspect of the "moving" oxidation step in the catalyst activations of this disclosure have been found to be particularly useful for large, commercial activations, for example, involving the charging of at least 100 lbs (pounds) of unactivated catalyst, at least 200 lbs, at least 300 lbs, at least 400 lbs, at least 500 lbs, at least 600 lbs, or even at least or up to 1000 lbs of unactivated catalyst.

In a further aspect, step e) of the process disclosed above can comprise exposing the chromium catalyst to an inert atmosphere or an oxidative atmosphere while allowing the chromium catalyst to cool to a temperature less than about 300° C., 250° C., less than about 240° C., less than about 230° C., less than about 220° C., less than about 210° C., less than about 205° C., less than about 204° C., less than about 200° C., less than about 190° C., less than about 180° C., less than about 170° C., less than about 160° C., less than about 150° C., less than about 140° C., less than about 130° C., less than about 120° C., less than about 110° C., or less than about 100° C. over the cooling time ($t^C$), to provide the activated chromium catalyst, wherein the lower limit of the temperature in each occurrence is about ambient temperature. Therefore, step e) can comprise exposing the chromium catalyst to either an inert atmosphere while allowing the chromium catalyst to cool over the cooling time ($t^C$), or can comprise simply allowing the chromium catalyst to cool in the oxidative atmosphere used in the previous step, or any other oxidative atmosphere if desired, over the cooling time ($t^C$), to provide the activated chromium catalyst.

The disclosed processes for activating chromium polymerization catalysts, can use lower maximum activation temperatures and shorter activation times than conventional activation methods. For example, the activation process set out in steps a) through e) above can be carried out over a time period of less than 16 hours, less than 15 hours, less than 14 hours, less than 13 hours, less than 12 hours, less than 11 hours, or less than 10 hours, and wherein the lower limit of the time period in each occurrence is about 4 hours. In another aspect, for example, the activation process set out in steps a) through e) above can be carried out over a time period of about 16 hours, about 15 hours, about 14 hours, about 13 hours, about 12 hours, about 11 hours, about 10 hours, about 9 hours, or about 8 hours, or any range between any of these values.

In one aspect, the catalyst support can be an oxide such as a refractory oxide support comprising, consisting of, or selected from silica, alumina, silica-alumina, titania-coated silica, aluminophosphate, other metal oxides, or combinations thereof. In another aspect, the catalyst support can be a spherical and/or spheroidal refractory oxide support. In an aspect, the supported chromium catalyst can be a Cr/silica catalyst or a Cr/titania-coated silica catalyst.

This disclosed activation process can be carried out on a benchtop or laboratory scale, or on a commercially viable scale, such as using 500 pounds of supported chromium catalyst or more, often in a fluidized bed. The activation process set out in steps a) through e) above and the optional conditioning process can be carried out in a common heating zone, or step a) through step e) and the optional conditioning process can be carried out in at least two different heating zones. This process for activating a supported chromium catalyst and the optional conditioning process can be carried out in a batch mode, or they can be carried out in a continuous mode.

Various types of activator vessels, equipment, or apparatus can be used to activate catalysts according to this disclosure, including but not limited to, rotary calciners, static pan drying, and fluidized beds. Such equipment can operate in a static or batch mode, or in a continuous mode. In the case of a static or batch mode, a vessel or apparatus containing the catalyst bed can be subjected sequentially to various stages of the activation process. For a continuous mode, the stages of the process can occur in a series of zones through which the catalyst passes on its path through the activation apparatus.

In a fluidized bed activator, the fluidizing gas flows upward through a grid plate to form the fluidized bed of the supported catalyst particles. In an aspect, the gas flow for fluidized bed activators can range from about 0.01 to about 1 foot per second (0.01 to 30 cm/sec). Alternatively, the gas velocity can range from about 0.05 to about 0.5 ft/sec (1.5 to 15 cm/sec), or from about 0.1 to about 0.3 ft/sec (3–9 cm/sec).

Catalysts suitable for activating according to this disclosure include any catalysts suitable for polymerizing olefins and comprising chromium on a support. In an aspect, the chromium content can range from about 0.1 weight percent (wt %) to about 10 wt %, that is weight percent based upon the total weight of the catalyst. Alternatively, the chromium content can range from about 0.2 wt % to about 5 wt %, from about 0.3 wt % to about 3.5 wt %, or from about 0.5 wt % to about 2 wt %. Suitable supports for chromium catalysts include, but are not limited to, silica, alumina, aluminophosphates, metal oxides such as oxides of titanium, zirconium, boron, zinc, magnesium, and the like, or combinations thereof. Suitable supports may also contain other promoters including, but not limited to, fluoride, sulfate, fluoroborates, silicofluorides and the like, if desired. Suitable catalysts can be purchased from commercial sources such as the Grace Davison Division of W. R. Grace & Company, Columbia, Md.

Catalyst Conditioning Process

In another aspect of the disclosed process, a catalyst conditioning step or conditioning process can be used prior to steps a) through e) of the above-described process. Therefore, this disclosure provides a process comprising steps a) through e) as set out above, wherein step a) of heating the supported chromium catalyst to the first temperature ($T^1$) is preceded by a conditioning process, the conditioning process comprising heating the supported chromium catalyst to a conditioning temperature ($T^C$) in an oxidative or inert atmosphere at a conditioning ramp rate ($RR^C$), and holding the chromium catalyst at $T^C$ in the oxidative atmosphere for a conditioning time ($t^C$) to provide a conditioned chromium catalyst. The oxidative atmosphere used in the conditioning process can be any oxidative atmosphere disclosed herein, for example, the oxidative atmosphere can comprise air or oxygen. The oxidative atmosphere also can comprise air or oxygen having a dew point of less than about −40° C., less than about −50° C., less than about −60° C., less than about −70° C., or less than about −80° C., for example about −82° C. (−116° F.).

In an aspect for example, the conditioning temperature ($T^C$) can be from about 200° C. to about 450° C., from about 250° C. to 400° C., or from about 275° C. to 375° C. Alternatively, the conditioning temperature ($T^C$) can be about 200° C., about 225° C., about 250° C., about 275° C., about 300° C., about 325° C., about 350° C., about 375° C., about 400° C., about 425° C., or about 450° C., or any range between any of these values. While not intending to be bound by theory, this initial catalyst conditioning process in air at low temperatures is thought to burn off residual organic contaminants left from catalyst preparation, such as Cr acetate or Ti ligands and provide an improved activation process and catalyst itself, without fully oxidizing the chromium in the catalyst to Cr(VI).

In one aspect for example, the conditioning ramp rate ($RR^C$) can be from about 0.5° C./minute to about 5° C./minute. Alternatively for example, the conditioning ramp rate ($RR^C$) can be about 1° C./minute, about 3° C./minute, about 1° C./minute, or about 2° C./minute, or any range between any of these values.

In an aspect, the conditioning process can include holding the chromium catalyst at $T^C$ in the oxidative atmosphere for a conditioning time ($t^C$). In some aspects for example, the conditioning time ($t^C$) can be less than about 5 hours, less than about 3 hours, less than about 2.5 hours, less than about 2 hours, less than about 1.5 hours, less than about 1 hour, or less than about 0.5 hours. In one aspect, the conditioning time ($t^C$) can be 0 hours, such that the conditioning process comprising heating the supported chromium catalyst to a conditioning temperature ($T^C$) in an oxidative atmosphere at a conditioning ramp rate ($RR^C$), followed by continued heating of the supported chromium catalyst in an inert atmosphere to the first temperature ($T^1$) at the first ramp rate ($RR^1$), without any conditioning hold time ($t^C$). In this aspect, the conditioning ramp rate ($RR^C$) and the first ramp rate ($RR^1$) can be the same or can be different, such that $RR^C$ can be greater than, equal to, or less than $RR^1$. In a further aspect, the conditioned chromium catalyst can be exposed to an inert atmosphere following heating the supported chromium catalyst to a conditioning temperature ($T^C$) in an oxidative atmosphere. In an aspect, the conditioning process can be carried out in a fluidized bed, and the subsequent catalyst activation process can also be carried out in the fluidized bed if desired.

In a further aspect, the conditioning process can involve a cycling between an oxidative atmosphere and an inert atmosphere one or more times in which to burn off organic compounds on the catalyst. In this aspect, the "conditioning temperature" $T^C$ is considered the first temperature that the catalyst is heated to at the start of the cycling process. This aspect of the disclosure has been found to be useful for large scale commercial embodiments of the activation process. In aspect, for example, with respect to steps a) through e) of the activation process disclosed above, if desired, step a) of heating the supported chromium catalyst to the first temperature ($T^1$) can be preceded by a conditioning process, the conditioning process comprising:

a) heating the supported chromium catalyst to a conditioning temperature ($T^C$) in an inert atmosphere at a conditioning ramp rate ($RR^C$), and holding the chromium catalyst at $T^C$ in the inert atmosphere for a first conditioning time ($t^{C1}$);

b) exposing the supported chromium catalyst to an oxidative atmosphere for a second conditioning time ($t^{C2}$);

c) exposing the supported chromium catalyst to an inert atmosphere for a third conditioning time ($t^{C3}$);

d) repeating steps b) and c) between 0 and 15 times to provide a conditioned chromium catalyst.

In this aspect of the cycling process for conditioning the catalyst, the formal "conditioning temperature" $T^C$ can be considered as the first temperature to which the catalyst is heated at the start of the cycling process, although conditioning in this aspect actually occurs over a temperature range. Specifically, upon exposure to the oxidative atmosphere, the temperature typically rises as the organics are burned off, and upon re-exposure to an inert atmosphere, the temperature decreases until the next exposure to an oxidative atmosphere. This cycling between oxidative and inert atmospheres can occur 0, 1, 2, 3, 4, 5, 6, 7, 8, 9, 10, 11, 12, 13, 14, or even 15 times, up to about 20 times if desired, or any range between these numbers. For example, the number of oxidizing atmosphere/inert atmosphere cycles can be from 1-10, from 2-8, or from 3-6. The oxidative and inert atmospheres used in any of the conditioning processes or steps can be any oxidative and inert atmospheres disclosed herein. For example, the oxidative atmosphere can be air or a blend of oxygen and nitrogen with a different percentage of oxygen than in air, for example 50% oxygen and 50% nitrogen.

With each step, the temperature rise upon a subsequent exposure to the oxidative atmosphere is generally less than the temperature rise upon the preceding exposure to the oxidative atmosphere. Therefore, the organic materials and compounds are removed over a "conditioning temperature range." In an aspect for example, this "conditioning temperature range" can be from about 500° F. to about 1000° F., from about 600° F. to about 900° F., or from about 700° F. to about 800° F. According to another aspect, the exotherm generated by these short bursts of air can less than about 300° F., less than about 200° F., less than about 100° F., or less than about 50° F. Because the exotherm diminishes with each subsequent cycle, the lower limit of the exotherm can be about 30° F., about 25° F., about 20° F., about 15° F., about 10° F., or about 5° F. Further, in aspects, the time durations for the oxidative atmosphere exposure bursts can be from about 1 min to about 30 min, from about 2 min to about 15 min, from about 2 to about 10 min, or from about 2 min to about 5 min.

Activated Catalysts

This disclosure also provides a supported chromium catalyst prepared according the disclosed process. In one aspect, the catalyst support can be an oxide such as a refractory oxide support comprising, consisting of, or selected from silica, alumina, silica-alumina, titania-coated silica, aluminophosphate, other metal oxides, or combinations thereof. For example, the supported chromium catalyst can be a Cr/silica catalyst or a Cr/titania-coated silica catalyst. Processes for preparing supported chromium catalysts prior to activation have been disclosed in, for example, U.S. Pat. Nos. 4,151,122; 4,234,462; 5,093,300; 7,981,832; and 9,006,363 and in M. P. McDaniel et al., *Journal of Catalysis*, 82, 98–109 (1983) and M. P. McDaniel et al., *Applied Catalysis A*, 335, 252–261 (2008), each of which is incorporated by reference herein in pertinent part.

The chromium catalyst activated according to this disclosure can contain relatively low levels of chromium (VI). In an aspect, for example, the activated chromium catalyst can comprise for example, by weight, less than 1.0% Cr(VI), less than 0.8% Cr(VI), less than 0.6% Cr(VI), less than 0.5% Cr(VI), less than 0.4% Cr(VI), less than 0.3% Cr(VI), less than 0.2% Cr(VI), less than 0.1% Cr(VI), or less than 0.05% Cr(VI), and wherein the lower limit of the activated chromium catalyst by weight in each occurrence is about 0.01% Cr(VI). In a further aspect, the activated chromium catalyst can comprise for example, by weight, about 0.6% Cr(VI), about 0.5% Cr(VI), about 0.4% Cr(VI), about 0.3% Cr(VI), about 0.2% Cr(VI), about 0.1% Cr(VI), or about 0.05% Cr(VI). These low levels of chromium (VI) contrast with conventional air activation of supported chromium catalysts which can include from 0.8 wt % to 2 wt % Cr(VI).

It has been discovered that the activated supported catalysts of this disclosure can provide olefin polymer having a melt index (MI) greater than the MI of a reference polyolefin prepared under identical conditions as the olefin polymer using the disclosed catalysts, with the exception that a reference chromium catalyst is activated by air oxidation in a conventional fashion. That is, in the disclosed catalysts that are activated as described herein, a lower polymerization temperature is required to provide a polyolefin with the same melt index as the reference polyolefin prepared using a conventionally-activated catalyst.

In an aspect for example, this disclosure provides a supported Cr/titania-coated silica catalyst prepared according to the disclosed processes, wherein:

a) the activated chromium catalyst comprises less than 0.5% Cr(VI) by weight; and b) under polymerization conditions, the activated chromium catalyst is contacted in a reaction zone with at least one $C_2$ to $C_8$ mono-1-olefin to form an olefin polymer having a melt index (MI) greater than the MI calculated from the following equation:

$$MI > 8 \times [0.00050124 \exp(0.00830795 \cdot T)] \times [0.0994(PV)^3 - 0.7843(PV)^2 + 2.0147(PV) - 0.8824] \times [-0.6102(Ti)^3 + 1.2715(Ti)^2 + 0.003(Ti) + 0.2];$$

wherein T (° C.) is the average temperature used under polymerization conditions, PV (cc/g or mL/g) is the pore volume of the activated chromium catalyst, and Ti (atoms/nm$^2$) is the titanium concentration in the activated chromium catalyst. In this aspect, the pore volume can be in a range of from about 0.3 mL/g (cc/g) to about 5.0 mL/g, from about 0.4 mL/g to about 4.5 mL/g, from about 0.5 mL/g to about 4.0 mL/g, from about 0.5 mL/g to about 3.5 mL/g, from about 0.5 mL/g to about 3.0 mL/g, from about 0.5 mL/g to about 2.5 mL/g, from about 0.7 mL/g to about 2.3 mL/g, from about 1.0 mL/g to about 2.2 mL/g, from about 1.2 mL/g to about 2.0 mL/g, or from about 1.4 mL/g to about 1.7 mL/g. Alternatively, the pore volume can be about 0.3 mL/g, about 0.4 mL/g, about 0.5 mL/g, about 0.6 mL/g, about 0.7 mL/g, about 0.8 mL/g, about 0.9 mL/g, about 1.0 mL/g, about 1.1 mL/g, about 1.2 mL/g, about 1.3 mL/g, about 1.4 mL/g, about 1.5 mL/g, about 1.6 mL/g, about 1.7 mL/g, about 1.8 mL/g, about 1.9 mL/g, about 2.0 mL/g, about 2.1 mL/g, about 2.2 mL/g, about 2.3 mL/g, about 2.4 mL/g, or about 2.5 mL/g, about 3.0 mL/g, about 3.5 mL/g, about 4.0 mL/g, about 4.5 mL/g, or about 5.0 mL/g, or any ranges or combinations of ranges therebetween. Also in this aspect, the titanium concentration or coverage (atoms/nm²) can be from about 0 atoms/nm² to about 5 atoms/nm², from about 0 atoms/nm² to about 4.5 atoms/nm², from about 0 atoms/nm² to about 4.0 atoms/nm². Alternatively, the titanium concentration can be 0 atoms/nm², about 0 atoms/nm², about 0.1 atoms/nm², about 0.2 atoms/nm², about 0.3 atoms/nm², about 0.4 atoms/nm², about 0.5 atoms/nm², about 0.6 atoms/nm², about 0.7 atoms/nm², about 0.8 atoms/nm², about 0.9 atoms/nm², about 1.0 atoms/nm², about 1.1 atoms/nm², about 1.2 atoms/nm², about 1.3 atoms/nm², about 1.4 atoms/nm², about 1.5 atoms/nm², about 1.6 atoms/nm², about 1.7 atoms/nm², about 1.8 atoms/nm², about 1.9 atoms/nm², about 2.0 atoms/nm², about 2.2 atoms/nm², about 2.4 atoms/nm², about 2.6 atoms/nm², about 2.8 atoms/nm², about 3.0 atoms/nm², about 3.2 atoms/nm², about 3.4 atoms/nm², about 3.6 atoms/nm², about 3.8 atoms/nm², about 4.0 atoms/nm², about 4.2 atoms/nm², about 4.4 atoms/nm², about 4.6 atoms/nm², about 4.8 atoms/nm², about 5.0 atoms/nm², or any range or combination of ranges therebetween.

In a further aspect, this disclosure provides a supported Cr/titania-coated silica catalyst prepared according to the disclosed processes, wherein:
a) the activated chromium catalyst comprises less than 0.5% Cr(VI) by weight; and
b) under polymerization conditions, the activated chromium catalyst is contacted in a reaction zone with at least one $C_2$ to $C_8$ mono-1-olefin to form an olefin polymer having a melt index (MI) greater than the MI calculated from the following equation:

$$MI > 4.8 \times [0.0994(PV)^3 - 0.7843(PV)^2 + 2.0474(PV) - 0.8824] \times [-0.6102(Ti)^3 + 1.2715(Ti)^2 + 0.003(Ti) + 0.2];$$

wherein PV (cc/g) is the pore volume of the activated chromium catalyst, and Ti (atoms/nm²) is the titanium concentration in the activated chromium catalyst. In this aspect, the pore volume can be in any range as disclosed immediately above, or the pore volume can be about any volume (mL/g) as disclosed immediately above. Further, the titanium concentration can be in any range as disclosed immediately above, or the titanium concentration can be about any concentration or coverage (atoms/nm²) as disclosed immediately above.

Process for Polymerizing Olefins

Catalysts activated according to this disclosure can be used in any type of olefin polymerization reactor known in the art which is used to polymerize olefin monomers to form olefin homopolymers or copolymers. In an aspect, such reactors can comprise or can be selected from slurry reactors, gas-phase reactors, solution reactors, or any combinations thereof. For example, gas phase reactors can comprise or can be selected from fluidized bed reactors or tubular reactors. In a further example, slurry reactors can comprise or can be selected from vertical loop or horizontal loop reactors. In an aspect, the solution reactors can comprise or can be selected from stirred tank or autoclave reactors. Any such reactors can be combined into multiple reactor systems operated in parallel or in series. The catalyst also may be used to produce ethylene polymers in a particle form process as disclosed in U.S. Pat. Nos. 3,624,063; 5,565,175; and 6,239,235, each of which is incorporated by reference herein in pertinent part. Various other polymerization processes are disclosed in U.S. Pat. Nos. 3,248,179; 4,424,341; 4,501,885; 4,613,484; 4,737,280; and 5,597,892; each of which is incorporated by reference herein in pertinent part.

Catalysts activated according to this disclosure can be used for polymerization of olefins to form homopolymers or copolymers from olefin monomers. Suitable olefin monomers include, but are not limited to, ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and combinations or mixtures thereof. The molecular weight of the polymer can be controlled by various means known in the art including but not limited to, adjusting the temperature, introducing or varying the amount of hydrogen present, or varying the catalyst compounds or other conditions.

Therefore, in an aspect, this disclosure also provides a process for polymerizing olefins using a supported chromium catalyst, in which the process can comprise:
a) activating the supported chromium catalyst according to the process disclosed herein, to provide the activated chromium catalyst; and
b) under polymerization conditions, contacting in a reaction zone the activated chromium catalyst with at least one $C_2$ to $C_8$ mono-1-olefin to form an olefin polymer.

In this olefin polymerization process, activating the supported chromium catalyst to provide the activated chromium catalyst can comprise: a) heating a supported chromium catalyst in an inert atmosphere to a first temperature ($T^1$) at a first ramp rate ($RR^1$); b) holding the chromium catalyst at the first temperature in the inert atmosphere for a first hold time ($t^{H1}$); c) allowing the chromium catalyst to attain a second temperature ($T^2$) in the inert atmosphere at a second ramp rate ($RR^2$), followed by exposing the chromium catalyst to an oxidative atmosphere; d) holding the chromium catalyst at the second temperature in the oxidative atmosphere for a second hold time ($t^{H2}$); and e) allowing the chromium catalyst to cool to a temperature below the second temperature in an inert atmosphere or in the oxidative atmosphere over a cooling time ($t^C$), to provide an activated chromium catalyst, as described herein. The first temperature ($T^1$) can be greater than or equal to the second temperature ($T^2$) ($T^2 \leq T^1$).

In another aspect, this disclosure also provides a process for polymerizing olefins using a supported chromium catalyst, in which the process can comprise:
a) conditioning the supported chromium catalyst according to the process disclosed herein, to provide the conditioned chromium catalyst;
a) activating the conditioned supported chromium catalyst according to the process disclosed herein, to provide the activated chromium catalyst; and
b) under polymerization conditions, contacting in a reaction zone the activated chromium catalyst with at least one $C_2$ to $C_8$ mono-1-olefin to form an olefin polymer.

For example, in this aspect, a process for polymerizing olefins using a supported chromium catalyst is provided, in which the process can comprise:
1) conditioning a supported chromium catalyst, the conditioning process comprising:
    a) heating a supported chromium catalyst to a conditioning temperature ($T^C$) in an inert atmosphere at a conditioning ramp rate ($RR^C$), and holding the chromium catalyst at $T^C$ in the inert atmosphere for a first conditioning time ($t^{C1}$);
    b) exposing the supported chromium catalyst to an oxidative atmosphere for a second conditioning time ($t^{C2}$);
    c) exposing the supported chromium catalyst to an inert atmosphere for a third conditioning time ($t^{C3}$);
    d) repeating steps b) and c) between 0 and 15 times using independently selected subsequent conditioning times ($t^{CS}$) with each step to provide a conditioned chromium catalyst;
2) activating the conditioned supported chromium catalyst, the activating process comprising:
   a) heating a supported chromium catalyst in an inert atmosphere to a first temperature ($T^1$) at a first ramp rate ($RR^1$);
   b) holding the chromium catalyst at the first temperature in the inert atmosphere for a first hold time ($t^{H1}$);
   c) allowing the chromium catalyst to attain a second temperature ($T^2$) in the inert atmosphere at a second ramp rate ($RR^2$), followed by exposing the chromium catalyst to an oxidative atmosphere;
   d) holding the chromium catalyst at the second temperature in the oxidative atmosphere for a second hold time ($t^{H2}$); and
   e) allowing the chromium catalyst to cool to a temperature below the second temperature in an inert atmosphere, in the oxidative atmosphere, or in any sequential combination of an inert atmosphere and an oxidative atmosphere over a cooling time ($t^C$), to provide an activated chromium catalyst; and
3) under polymerization conditions, contacting in a reaction zone the activated chromium catalyst with at least one $C_2$ to $C_8$ mono-1-olefin to form an olefin polymer.

In an aspect of this olefin polymerization process using a supported chromium catalyst, the at least one $C_2$ to $C_8$ mono-1-olefin can comprise ethylene. The at least one $C_2$ to $C_8$ mono-1-olefin can comprise ethylene and at least one $C_3$ to $C_8$ mono-1-olefin comonomer. For example, the at least one $C_2$ to $C_8$ mono-1-olefin can comprise ethylene and at least one of propylene, 1-butene, 1-hexene, or 1-octene.

In another aspect of this olefin polymerization process, the activated chromium catalyst can be a Cr/silica catalyst and can comprises, by weight, less than 0.5% Cr(VI), wherein the olefin polymer is characterized by a high load melt index (HLMI, g/10 min) of greater than 100 g/10 min. In another aspect of this olefin polymerization process, the activated chromium catalyst can comprise, by weight, less than 0.4% Cr(VI), and wherein the olefin polymer is characterized by a high load melt index (HLMI, g/10 min) of greater than 100 g/10 min.

In another aspect of this olefin polymerization process, the activated chromium catalyst can be a Cr/silica-titania catalysts, for example, a Cr/silica catalyst that has been impregnated with titanium. In an aspect, the titanium can be impregnated into or onto the Cr/silica catalyst by contact of the Cr/silica catalyst with a solution of a titanium compound such as a titanium alkoxide, for example, titanium(IV) n-propoxide, as understood by the person of ordinary skill in the art. In this aspect, the activated catalyst can contain about 2.0 wt % Ti, about 2.2 wt % Ti, about 2.4 wt % Ti, about 2.6 wt % Ti, about 2.8 wt % Ti, about 3.0 wt % Ti, about 3.2 wt % Ti, about 3.4 wt % Ti, about 3.6 wt % Ti, about 3.8 wt % Ti, about 4.0 wt % Ti, about 4.2 wt % Ti, about 4.4 wt % Ti, about 4.6 wt % Ti, about 4.8 wt % Ti, or about 5.0 wt % Ti, or any ranges between these values. In an aspect, the activated catalyst can contain from about 2.0 wt % Ti to about 5.0 wt % Ti, from about 2.3 wt % Ti to about 4.5 wt % Ti, from about 2.5 wt % Ti to about 4.0 wt % Ti, from about 2.7 wt % Ti to about 3.7 wt % Ti, from about 2.8 wt % Ti to about 3.5 wt % Ti, or from about 3.0 wt % Ti to about 3.3 wt % Ti. In a further aspect, the Cr/silica-titania catalysts can have a chromium content about the same as the Cr/silica catalysts.

Another aspect of the olefin polymerization process is that the catalyst activated as disclosed herein can produce a polyolefin having the same melt index (MI, g/10 min) as a polyolefin produced by the same process except using a conventionally-activated chromium catalyst, but at a lower temperature as compared to the conventionally-activated chromium catalyst. Using the same conditions including temperature, the olefin polymer prepared using the disclosed catalyst can have a melt index (MI, g/10 min) greater than the MI of the reference polyolefin made using a conventionally-activated chromium catalyst.

Therefore, disclosed herein is a process for polymerizing olefins using a supported chromium catalyst, in which the process can comprise: a) activating the supported chromium catalyst according to the process disclosed herein, to provide the activated chromium catalyst; and b) under polymerization conditions, contacting in a reaction zone the activated chromium catalyst with at least one $C_2$ to $C_8$ mono-1-olefin to form an olefin polymer; wherein:
   a) the olefin polymer has a melt index (MI) greater than the melt index ($MI^R$) of a reference polyolefin; and
   b) wherein the reference polyolefin is prepared under identical conditions as the olefin polymer, with the exception that a reference chromium catalyst is used in preparing the reference polyolefin, which is activated by:
      i) heating the supported chromium catalyst to an activation temperature of from 600° C. to 1000° C. ($T^1$) in air and holding the chromium catalyst at the activation temperature in air for 3 hours; and
      ii) allowing the chromium catalyst to cool below 700° F. (371° C.) in air, followed by purging to or at ambient temperature in an inert atmosphere to provide the activated reference chromium catalyst.

In this aspect, the olefin polymer prepared using the disclosed catalyst can have a melt index (MI, g/10 min) at least 10% greater, at least 15% greater, at least 20% greater, at least 25% greater, at least 50% greater, at least 100% greater, at least 200% greater, at least 300% greater, or at least 500% greater than the MI of the reference polyolefin, and wherein the upper limit of the melt index of the olefin polymer is about 1000% greater than the MI of the reference polyolefin.

Also in this aspect, the activation time of the activated chromium catalyst can be less than about 80%, about 70%, about 60%, about 50%, or about 40% of the activated reference chromium catalyst. The olefin polymer prepared using the disclosed catalyst can have a melt index (MI) about 10%, about 20%, about 30%, about 40%, about 50%, about 60%, about 70%, about 80%, about 90%, or about 100% greater than the melt index ($MI^R$) of the reference polyolefin. Further, the olefin polymer prepared using the disclosed catalyst can have a broader molecular weight distribution based upon Mw/Mn, Mz/Mn, or any appropriate ratio of Mn, Mw, Mx. Mv, or M(z+n) as compared to the reference polyolefin. In some aspects, the olefin polymer prepared using the disclosed catalyst can have a greater long chain branching (LCB) content as compared to the reference polyolefin. According to a further aspect, the high load melt index (HLMI, g/10 min), can be greater than about 20, greater than about 30, greater than about 40, greater than about 50, greater than about 75, greater than about 100, greater than about 125, greater than about 150, greater than about 175, or greater than about 200, or numbers between any of these values. In this aspect, the upper limit of the high load melt index (HLMI, g/10 min) can be about 300.

Pre-Reactor Reduction to Cr(II)

Most commercial manufacture of polyethylene with the Phillips catalyst is carried out with Cr(VI)/silica as the catalyst, in which Cr(VI) can be reduced by ethylene in the reactor to form a lower oxidation state active precursor, for example, Cr(II) or Cr(III). In an aspect, this disclosure provides for the reduction of Cr(VI) to Cr(II) before the catalyst is added into the reactor. According to one aspect, for example, treatment in carbon monoxide (CO) at about 350° C. has been found to reduce the hexavalent chromium Cr(VI) almost quantitatively to a divalent Cr(II) species. This reduction using CO can be followed by flushing out the residual CO with an inert gas such as $N_2$ before the catalyst is allowed to cool. While not intending to be bound by theory, it is thought that residual CO can be chemisorbed and may poison the catalyst.

Carbon monoxide (CO) begins to react with Cr(VI)/silica even at room temperature, although that reaction can be slow, such that over a period of several hours the Cr(VI) can become extensively reduced at 25° C. Following this process, purging with $N_2$ at higher temperatures can be used to remove the adsorbed CO. The CO-reduced catalysts can be observed to have a green color in vacuum or argon, but they turn sky-blue when $N_2$ is added, and the reduced catalyst turns a deeper indigo blue when it is exposed to ethylene. If the catalyst, after reduction in CO at 350° C., is cooled in CO it can have a violet color. The CO-reduced catalysts usually exhibit short or no induction times, and this feature can be helpful when low reaction temperatures are desired or when higher activity is desired.

In an aspect, the CO-reduced catalysts according to this disclosure can produce a slightly narrowed MW distribution polymer as compared to conventionally activated catalysts, for example, when the support contains titania, as shown in FIG. 1. The low-MW shoulder contributed by titania is partly removed by the CO reduction. Not intending to be bound by theory, this observation may suggests that some sites associated with titania do not survive the reduction or that these sites tend to be less stable. Because of this change in the MW (molecular weight) distribution, the melt index potential of CO-reduced catalysts is lowered by up to one-half. The polymer produced by CO reduced catalysts can have a slightly higher MW, and the elasticity can be diminished slightly. These trends are especially noticeable if the catalyst has first undergone a "two-step" activation as described herein below, which can amplify the effect of the titania. Catalysts containing no titania were observed to follow these same trends when treated with CO but to a lesser extent or degree.

Figure 2:
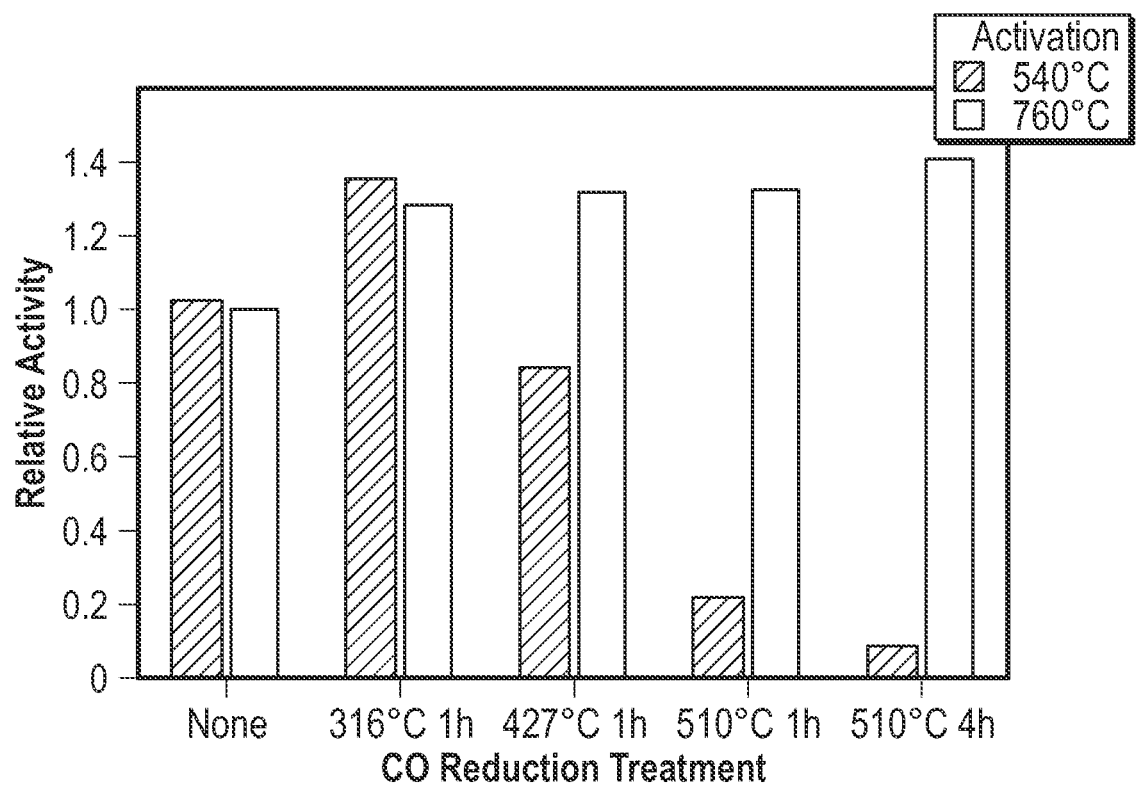
FIG. 2 demonstrates that the severity of the reduction treatment has an influence on the activity of the Cr/silica catalysts, showing two samples of a Cr/silica catalyst, activated at 540° C. and at 760° C., which were exposed to gradually more severe CO reduction treatments, as determined by both temperature and time.

In an aspect, the temperature for reduction in CO can be from about 250° C. to about 525° C., from about 275° C. to about 475° C., or from about 300° C. to about 400° C. At lower temperatures the reduction can be incomplete, and at higher temperatures the Cr(II) species may be somewhat unstable, as illustrated in the FIG. 2. In FIG. 2, samples of Cr/silica catalyst, activated at 540° C. and at 760° C., were exposed to gradually more severe CO reduction treatments, as determined by both temperature and time. In each series, the first reduction treatment at 316° C. improved the average activity. However, with more severe reduction treatments at higher temperatures, the catalyst initially activated at 540° C. lost nearly all of its activity. In contrast, the catalyst activated at 760° C. was hardly affected. While not intending to be bound by theory, this result suggests that Cr(II) species may react with surface OH groups, which may yield inactive Cr(III) and also may suggest that the catalyst may have a smaller OH population when activated at 760° C. than when activated at 540° C. In addition, it is believed that OH groups may not become mobile enough to react until the reduction temperature approaches the previous annealing temperature.

Anhydrous Impregnation of Chromium

Cr(VI) attachment to silica can be described as an esterification with pairs of silanol groups on a fully hydrated surface. It is generally thought that such a reaction cannot occur if the silica has first been calcined above 600° C. and if the impregnation of chromium is done from an anhydrous, aprotic solvent, to prevent re-hydration of the silica surface. Nevertheless, in an aspect of this disclosure, such a catalyst can be made in which Cr(VI) does attach to the silica surface through reaction with siloxanes. While not bound by theory, it is thought that the most reactive siloxanes may be strained or distorted. Such catalysts can provide some useful properties, including the ability to produce polymers of extremely high melt index (low Molecular Weight, MW). Also while not bound by theory, it is thought that the reaction of chromium with strained siloxanes may place the chromium in an environment where it can be highly reactive. If titania is present, the usual MI response can be even more enhanced as compared to when titania is not present. This observation may indicate a more selective insertion of Cr(VI) into the more polar, and perhaps strained as well, Ti—O—Si oxide surface bridges. Scheme 1 illustrates the possible insertion of Cr(CrO$_3$) into siloxanes following anhydrous impregnation.

Scheme 1

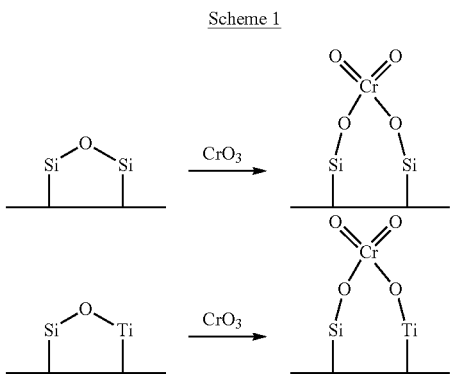

Figure 3:
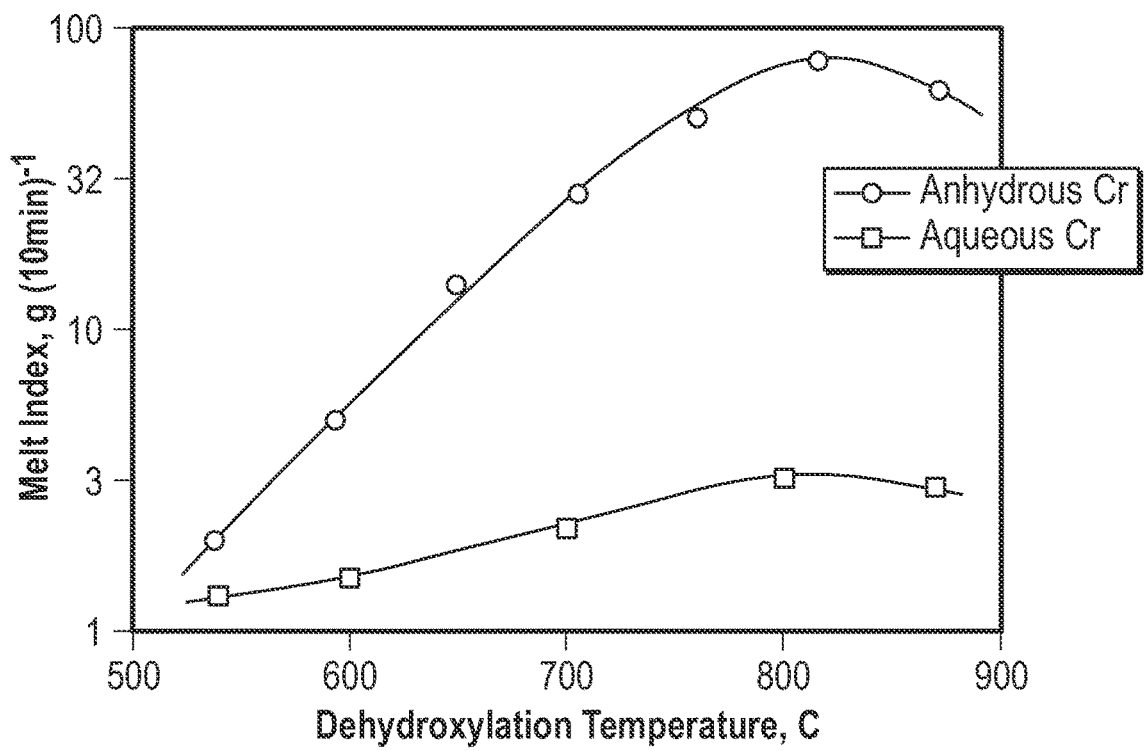
FIG. 3 provides a plot of dehydroxylation temperature versus melt index for a Cr/silica-titania catalyst. The lower line results are from aqueous $CrO_3$ applied to silica-titania, which was then calcined at the temperature plotted. The upper line results are from the support alone which was calcined at the temperature plotted, then $CrO_3$ in $CH_3CN$ was applied, followed by calcination at 250° C. The reaction temperature was 102° C.

In an aspect, the performance of a catalyst prepared by the anhydrous impregnation of chromium is shown in FIG. 3. Silica-titania (2.2 Ti atoms nm$^{-2}$) was first calcined in air at various temperatures up to 870° C. for 3 h, as illustrated. Each sample was then impregnated with a solution of CrO$_3$ in CH$_3$CN (acetonitrile) to yield catalysts containing 0.5 wt % Cr. The catalysts were then subjected to a second calcination step in air at only 250° C. for 1 h to fix the chromium and drive off the solvent. This procedure is called a "two-step" activation because two calcination steps are involved, the first one without chromium and preferably at relatively high temperature to dehydroxylate the support, and a second one at lower temperature to attach the chromium.

These catalysts prepared by this anhydrous impregnation of chromium were then tested for polymerization activity, and FIG. 3 illustrates the melt index (MI) values of the polymers obtained. The MI is plotted against the temperature of the first calcination step, that is, the dehydroxylation temperature. The melt index rises with rising temperature up to the sintering point at about 800° C. to 900° C. Then it declines, in a manner similar to that of the conventional catalyst impregnated with chromium aqueously (i.e. a "one-step" activation).

For comparison, "one-step" activation is also shown in FIG. 3. For this one-step activation, other samples of the same virgin silica-titania support were impregnated with aqueous $CrO_3$, and then calcined at various temperatures up to 871° C. Therefore, this activation is the conventional one-step activation and it is represented by the lower line in FIG. 3. At each temperature the two-step procedure produces polymer having over 10 times higher melt index compared to the standard one-step method (note that the y-axis is a logarithm scale).

Figure 4:
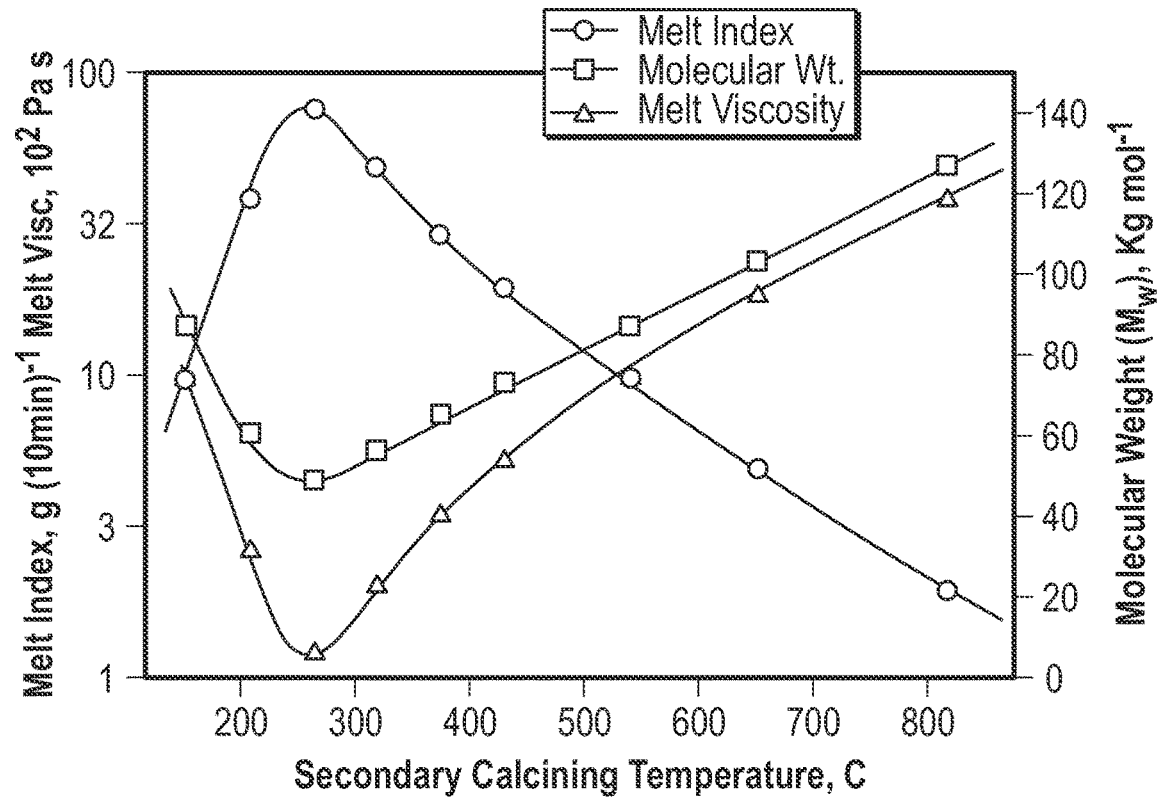
FIG. 4 presents a plot of the secondary calcining temperature versus melt index and demonstrates characteristics of a polymer from silica-titania which was calcined at 820° C., then impregnated with an anhydrous solution of Cr, followed by a secondary calcination step in air. Melt viscosity was measured at 190° C. and 0.1 $s^{-1}$.

FIG. 4 provides additional results related to the anhydrous impregnation of chromium. The same two-step procedure as described above was repeated except that the first calcination temperature (for dehydroxylation) was fixed at 820° C., and the second calcination temperature (for chromium attachment) was varied. Again, these catalysts were tested for polymerization activity, and the melt index values of the polymers produced are plotted against temperature. Secondary calcination temperatures of only about 150° C. produced active catalysts, because the support was already dehydroxylated. The polymers had melt index values that were higher at all temperatures than that obtained from a conventional one-step activation of the same support impregnated with aqueous chromium. The catalyst calcined at 250° C. produced polymer having the highest melt index, which was about 1000 times higher than that produced with the one-step activation at the optimum temperature.

The molecular weight is also shown in FIG. 4. High melt index values usually indicate a low MW. The melt viscosity is also shown, as measured at low shear rate ($0.1 \, s^{-1}$) which is an indication of the ease of flow under gravity in rotational-molding operations. The polymer melt viscosity declined significantly as the melt index increased.

For this anhydrous impregnation of chromium, the chromium compound can be impregnated onto the carrier by use of any anhydrous, aprotic solvent. The chromium source can be a hexavalent chromium compound, such as bis(t-butyl) chromate in pentane, or bis(triphenylsilyl) chromate in toluene, and even crown ethers can be used to dissolve Cr(VI) salts into to organic solvents. Alternatively, the chromium source need not be Cr(VI), because it will be oxidized during the second calcination step. Examples include lower-valent (lower oxidation state) compounds, such as diarenechromium(0) compounds in heptane or toluene, or compounds of trivalent chromium, such as chromium tris(acetylacetonate) in toluene or dry ether or even gas phase, or $CrCl_3$ in THF. Even chromyl chloride vapor can be used without a solvent. Residual chloride is burned away during the second calcination step. The optimum second calcination temperature (step 2, chromium attachment) varies with the accompanying anion, some of which can burn away more easily than others.

Contrary to the usual trend, the melt index values shown in FIG. 4 decrease when the catalyst is calcined at higher temperatures (in the second step). While not bound by theory, it is thought that the trend may indicate that these titania-associated sites are thermally unstable, and they may rearrange to another form (producing low-MI polymer), perhaps shifting off the titania. Comparing the 820° C. two-step point in FIG. 4 to the 820° C. one-step point in FIG. 3, we see that they are about the same. These two points correspond to the same level of carrier dehydroxylation (820° C.), and the chromium has experienced the same temperature (again 820° C.). At the highest temperatures in this comparison there is little or no difference between the one-step and the two-step activation.

Other activation treatments have been found to achieve similar enhancements in MI from reaction of chromium with siloxanes. In an aspect, organic compounds that can hydrolyze the Cr—O—Si links can result in redistribution of the chromium, and this rearrangement can enhance the melt index of the polymer produced if the silica surface is not significantly re-hydroxylated. For example, a Cr/silica-titania catalyst was calcined at 800° C. in a one-step activation as described above. Subsequently, the calcined catalyst was cooled and slurried in hexane to which one mole of t-butyl alcohol per mole of chromium was added. The solution turned slightly orange in color when the t-butanol was added. Not intending to be bound by theory, it is thought this color change may indicate hydrolysis of the Cr—O—Si bonds. The hexane was boiled away and the dry catalyst was then calcined again in air at only 300° C. The resultant catalyst was quite active for ethylene polymerization, and the melt index of the polymer was increased ten-fold by this t-butanol treatment (from 0.2 without treatment to 2.0 with the t-butanol). Again, while not intending to be bound by theory, the alcohol is thought to have hydrolyzed at least some of the chromium species, breaking the bonds linking it to the carrier, and allowing redistribution on the Ti.

Figure 5:
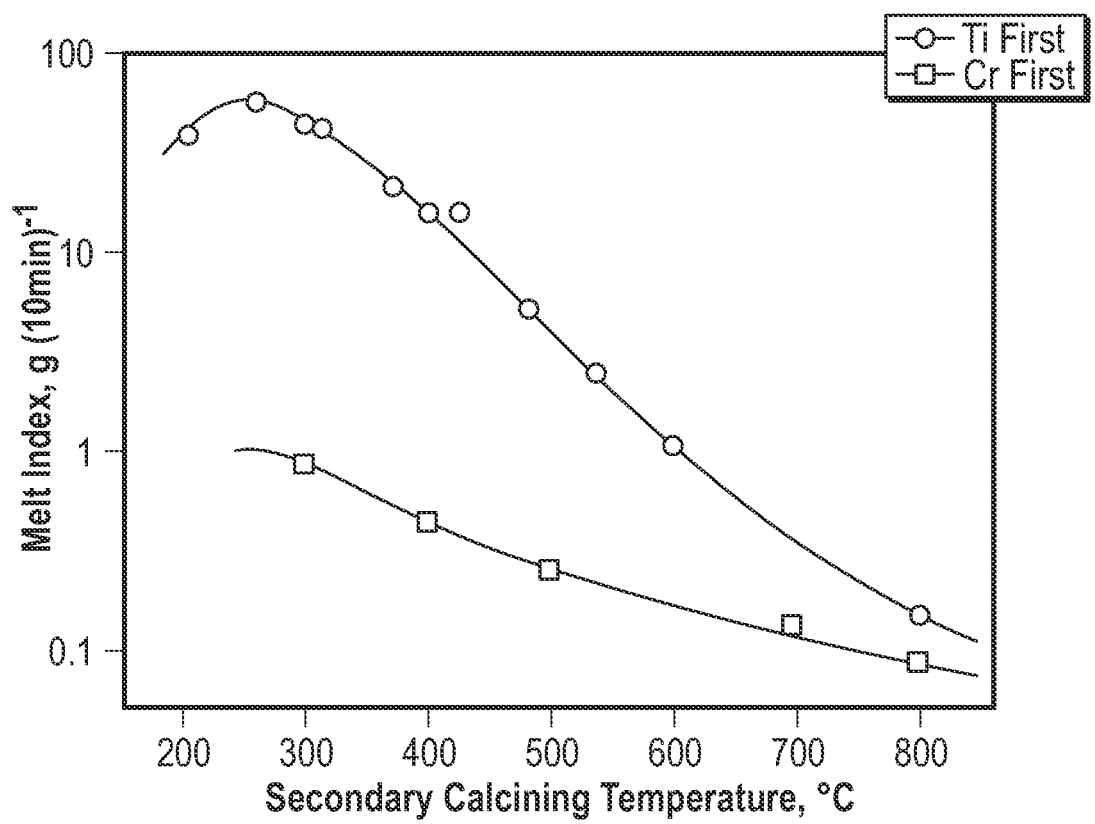
FIG. 5 plots the secondary calcining temperature versus melt index and shows that the order of impregnation of Cr versus Ti can be important in the 2-step activation. The upper line is data for silica-titania, calcined in air at 815° C., impregnated with an anhydrous solution of Cr, then heated in air at the temperature shown. The lower line is data for Cr/silica, calcined in air at 815° C., impregnated with anhydrous Ti, then heated in air at temperature shown. In this case, the Ti-first catalyst produces polymer having the highest melt index.

In an aspect, a variation of the above activation was conducted in which the order of titanium and chromium addition was reversed. Cr/silica was calcined (dehydroxylated) at 815° C. and subsequently treated with titanium isopropoxide in hexane. The dried catalyst was calcined a second time at various lower temperatures to burn off organics and attach the chromium. It was observed that even this treatment produced an enhancement in the polymer melt index. These catalysts were quite active, and the polymers obtained exhibited high melt index values. The lower curve in FIG. 5 is a plot of these MI values against the secondary calcination temperature. When the catalyst was calcined at temperatures higher than about 250° C., the MI values dropped. While not intending to be bound by theory, this result suggests that even the exposure to the titanium ester, and subsequent oxidation, can cause a redistribution of the chromium which allowed considerable interaction with the titania, and suggests that much of the titanate ester may react with the dehydroxylated silica enough to form an effective silica-titania support.

The MI values from the polymers in FIG. 5 (lower curve) are considerably lower than values obtained from the normal two-step activation of the same support, as is also shown in FIG. 5 as the upper curve. In the upper curve of FIG. 5, silica was 1) dried and treated with titanium isopropoxide, 2) calcined at 800° C., 3) impregnated with $CrO_3$ in $CH_3CN$, and 4) calcined again at various lower temperatures. Thus, the two curves can also be considered as representing the opposite order of impregnation, that is, titanium first (upper curve) vs. chromium first (lower curve). Noting that the melt index y-axis is a logarithmic scale, the two series in FIG. 5 are observed to provide significantly different melt index polymers. In an aspect, in the data illustrated in the lower curve, when the remaining titanium ester groups are burned away at lower temperatures, the catalyst is exposed to significant amounts of water vapor, which works against the two-step enhancement. Nevertheless, the behavior represented by the lower curve in FIG. 5 still definitely exhibits features of the two-step process. The two curves merge at a temperature near 800° C., where the two processes effectively become a one-step activation at a temperature of about 800° C., that is, the first calcination temperature and the second calcination temperature are about the same.

Figure 6:
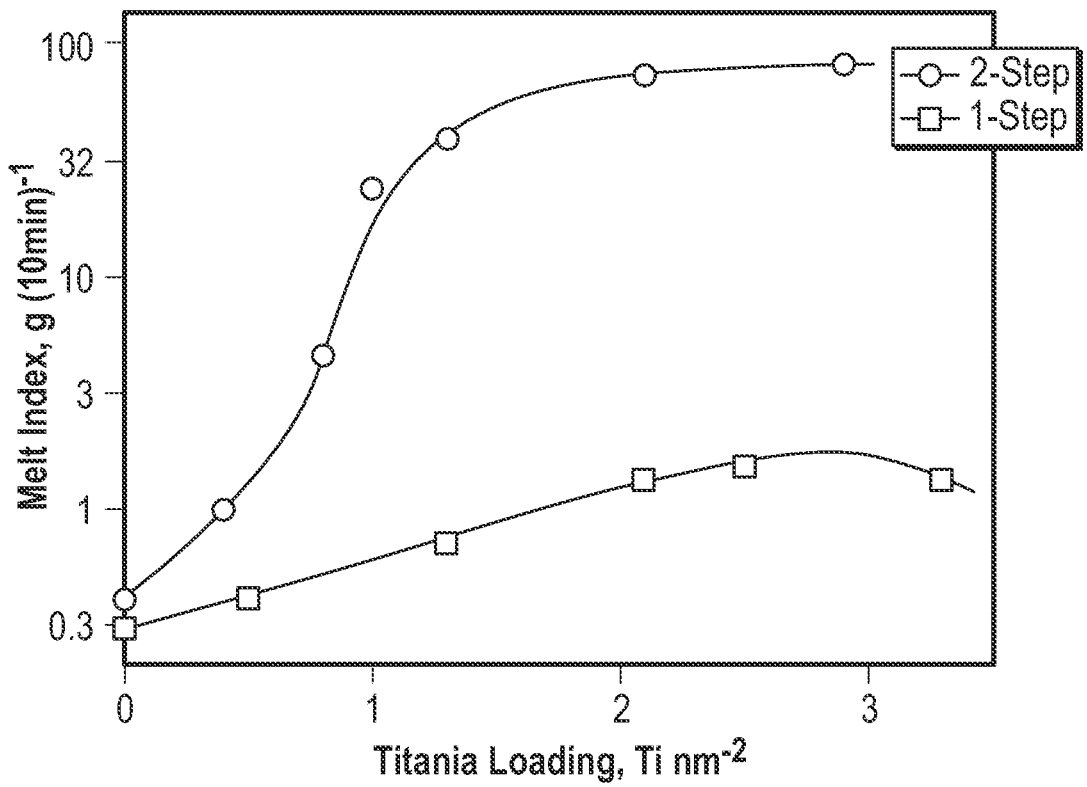
FIG. 6 plots the titania loading versus the meld index and shows that the melt index of a polymer made by a 2-step-activated catalyst is highly sensitive to the titania level. The lower line shows data for Cr/silica titanated and calcined at 815° C. The upper line shows silica titanated and calcined at 815° C., followed by Cr applied in hexane, then calcined at 260° C.

In an aspect, the two-step activation can provide a more pronounced melt index response to the presence of titania than does the one-step method. FIG. 6 shows an example of this behavior. The lower curve (one-step) represents catalysts that were made by titanating Cr/silica with titanium tetra-isopropoxide, followed by activation at 815° C. in air. The upper curve (two-step) represents catalysts that were made by titanating silica (no Cr) followed by impregnation of 0.5 wt % Cr as bis(t-butyl) chromate in hexane. Final calcination was carried out at 260° C. to attach the chromium. These catalysts were tested for ethylene polymerization and the resulting polymer was analyzed for melt index. FIG. 6 provides a plot of the melt index values obtained from the polymers made with each series of catalysts. Both curves show rising melt index as more titanium was added to the catalyst. However, the two-step activation method gives much higher values at each titanium content, and the separation between the two curves grew considerably as titania was added to each catalyst. Again, note that the y-axis is a logarithmic scale. Not intending to be bound by theory, it is thought that this pattern in FIG. 6 indicates that the two-step activation may tend to place more of the chromium in contact with the titania, and a second calcination at 815° C. brings the MI back down, perhaps indicating that the titania-associated site may be thermally unstable and possibly migrates to another form.

Figure 7:
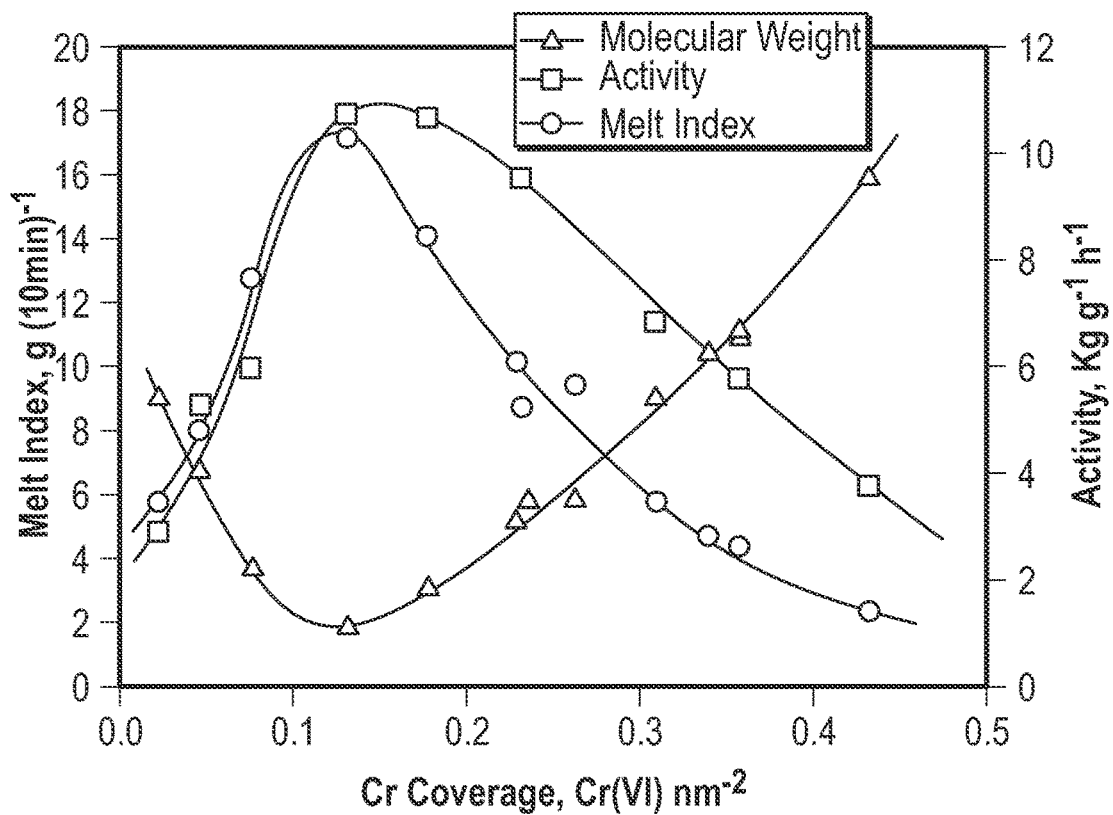
FIG. 7 illustrates data for melt index as a function of chromium coverage. The polymer MI and activity are influenced by Cr loading in the two-step activation process. These data are for silica-titania calcined at 871° C., treated with dicumene Cr(0) in pentane at various loadings, and calcined in air at 540° C. Saturation by Cr(VI) occurred at about 0.43 Cr $nm^{-2}$.

In an aspect, the chromium loading was also varied to study which sites are populated first in the two-step procedure. An example of this study is provided at FIG. 7. A silica-titania cogel (2.5 wt % Ti) was calcined at 871° C., impregnated with various amounts of dicumenechromium (0) in pentane, and then calcined again at 540° C. After polymerization at 107° C. the products were analyzed. FIG. 7 illustrates a plot of catalyst activity, polymer molecular weight (weight average molecular weight, Mw) and the polymer melt index, against the hexavalent chromium Cr(VI) coverage that was measured. At low chromium coverages, for example up to about 0.2 Cr $nm^{-2}$ (chromium atoms per $nm^2$ surface area), nearly all of the chromium, was converted to Cr(VI). Beyond that chromium loading, however, the conversion became less efficient, reaching saturation at about 0.45 Cr(VI) $nm^{-2}$, although the total chromium loading reached 1.3 Cr atoms $nm^{-2}$ (chromium atoms per $nm^2$ surface area.

Even the first increments of chromium added produced high-melt-index polymer, with the melt index being about two times higher than that of the one-step activation at a similar level of dehydroxylation. Both polymer melt index and catalyst activity peaked at only about 0.15 Cr(VI) $nm^{-2}$. While not bound by theory, this behavior suggests that the titania-associated sites were among the first to be populated, and later increments of chromium did not contribute as much to the MI enhancement. Again, while not bound by theory, it is conceivable and is consistent with the loss in catalyst activity that an excess of chromium changes the earlier chromium bonding to the surface, such as from the chromate species to dichromate.

Enhanced Dehydroxylation

This disclosure also provides for chemical methods to achieve enhanced dehydroxylation of the surface for improved catalyst performance, both in the one-step and two-step activations. In one aspect, for example, calcination of the support in CO (carbon monoxide) further lowers silanol concentrations. Not intending to be bound by theory, this may occur through a water gas shift type of reaction such as that suggested in Scheme 2. In another aspect, compounds containing carbon and sulfur, such as $CS_2$, COS, or $CH_3SH$, were also found to be effective in the promotion of dehydroxylation. Sulfur compounds containing no carbon, such as S, $H_2S$ or $SO_2$, were not effective. While not bound by theory, it is thought that the H (hydrogen) of a surface OH (hydroxyl) group may be removed as $H_2S$, and the O (oxygen) of a surface OH (hydroxyl) may be removed as CO (or when COS is used, possibly as $CO_2$). It is believed that elemental sulfur vapor may also be evolved from the reaction, but it does not appear to be left on the support. Thus, Scheme 2 illustrates that the dehydroxylation of silica is enhanced: (A) by CO through a water gas shift type reaction; (B) by $CS_2$ through an unknown reaction, such as the reaction suggested here; or (C) by replacement of bromide or iodide, followed by burn-off.

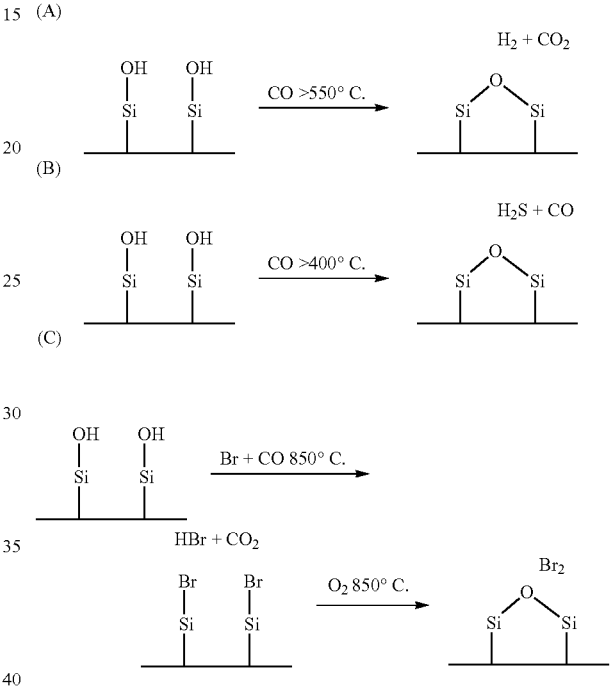

Figure 8:
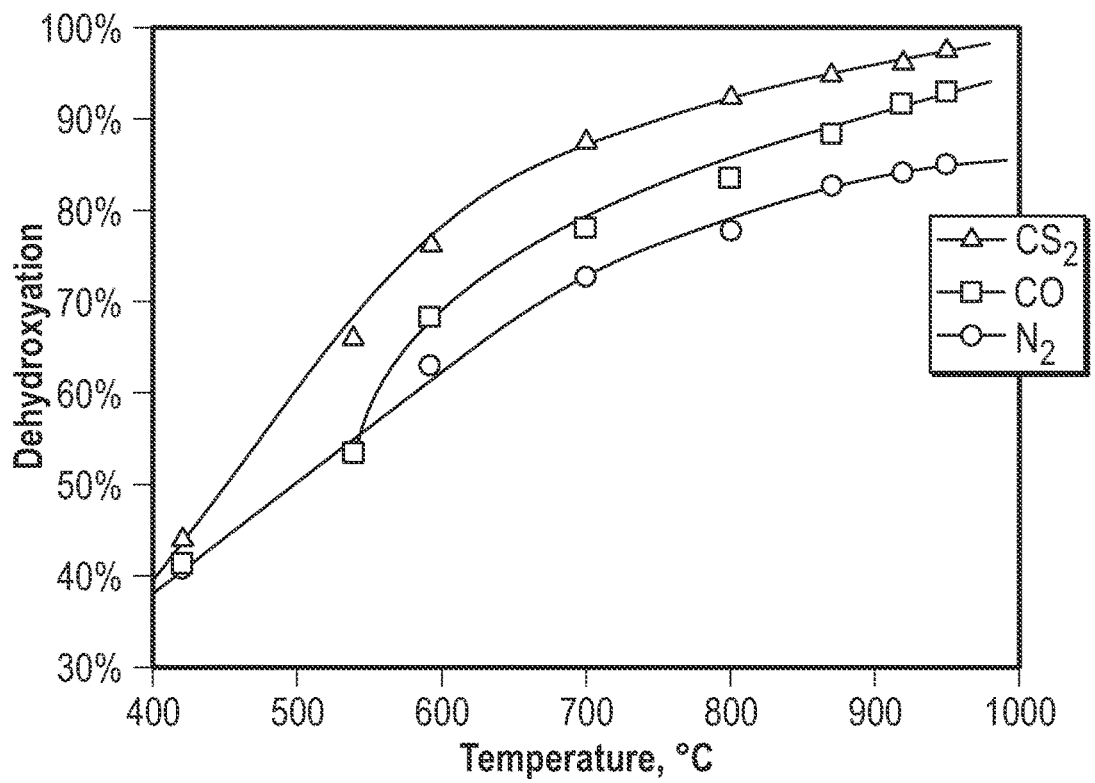
FIG. 8 provides a plot of dehydroxylation as a function of temperature. The extent of dihydroxylation of silicas treated in various gases as a function of high temperatures is show, where measurements were made by reaction with $CH_3MgI$ and referenced to the hydroxyl (—OH) population measured at 200° C.

FIG. 8 illustrates examples of these enhanced dehydroxylation techniques. The silanol population on a simple silica was measured by the reaction with $CH_3MgI$ after various activation treatments. Samples were calcined at temperatures from 200° C. to nearly 1000° C. in three atmospheres, $N_2$, CO, and CO into which $CS_2$ (1 mL) was vaporized. The y-axis in FIG. 8 represents the extent of dehydroxylation found after these treatments. The values are referenced to silica calcined at 200° C. in $N_2$, which was considered full hydroxylation for this comparison. On this scale, 100% dehydroxylation signifies that all OH groups have been removed. As seen in FIG. 8, calcination in $N_2$ removed silanol groups, and higher temperatures led to greater dehydroxylation. However, even at 950° C., only about 80% of the OH population (at 200° C.) was removed. Calcination in CO was more effective, causing more dehydroxylation, starting at about 550° C. to 600° C., at which temperature the two curves (representing calcination in CO vs. $N_2$) separate. Treating the silica in $CS_2$ vapor caused even more dehydroxylation, and one sample even reached some 97% OH group removal by 950° C. In an aspect, sulfur seems to become an effective dehydroxylation agent at lower temperatures than CO. At about 400° C., the FIG. 8 curve representing results from the $CS_2$ dehydroxylation separates from that representing dehydroxylation under $N_2$.

These enhanced dehydroxylation treatments can influence catalyst performance and the resultant polymer, as illustrated in the examples of Table 1. In each case, silica-titania (2.5 wt % Ti) was calcined at 870° C. in the atmosphere shown. Then 0.5 wt % Cr was impregnated onto the carrier as dicumenechromium(0) in pentane, followed by a final calcination treatment in air at 316° C. to 593° C. Therefore, each sample was given a two-step activation, in which the first calcination step was carried out in the atmosphere listed in Table 1. Each catalyst was then tested for ethylene polymerization activity, and the polymer that was produced was recovered and analyzed.

In an aspect, the weight-average molecular weight $M_w$ of the polymer (Table 1) was found to decline significantly when CO was used as the calcination gas for the support, although the chromium and CO were never in contact with each other. While not intending to be bound by theory, this finding suggests that CO affects catalyst performance through its influence on the support only. Using $CS_2$ as a calcination gas was found to lower the polymer molecular weight ($M_w$) by about two thirds. The reduced MW is manifested in other properties as well, including elevated melt index and lowered melt viscosity. For example, the use of CO more than doubled the melt index and $CS_2$ raised melt index some 60-fold. The last row in Table 1 reports the fluidity, which, like melt index, is an indication of how easily the molten polymer flows at low-shear rates. Whereas melt index measures flow (shear) rate under constant shear stress, fluidity measures shear stress at constant shear rate ($0.1\ s^{-1}$). Like melt index, fluidity indicates how easily the molten polymer flows at low shear rates. Fluidity is the inverse of melt viscosity, and like MI it varies inversely with molecular weight.

TABLE 1

Enhanced dehydroxylation by various chemical reactions. Silica-titania was calcined at 870° C. in the gas indicated, then it was impregnated with dicumene Cr(0) in hexane, and finally it was calcined in air at 300° C.-593° C.

| Treatment | $N_2$ | CO | COS | $CO + I_2$, then air | $CO + Br_2$, then air |
|---|---|---|---|---|---|
| Mol. Wt., $M_w$, Kg mol$^{-1}$ | 118 | 97 | 38 | 82 | 70 |
| Melt Index, g (10 min)$^{-1}$ | 2.8 | 6.8 | 170 | 14 | 24 |
| Melt Visc. (0.1 s$^{-1}$), Pa s | 9,150 | 4,400 | 126 | 2,350 | 1,372 |
| Fluidity (0.1 s$^{-1}$). KPa$^{-1}$ s$^{-1}$ | 0.11 | 0.23 | 7.93 | 0.43 | 0.73 |

In the last two runs (experiments) represented in Table 1, silanol groups were replaced by halide groups. Bromide and iodide groups were selected over fluoride and chloride, because these halogens can be easily burned off of the silica surface, leaving siloxane. In these experiments, silica-titania samples were treated with either $I_2$ or $Br_2$ vapor in the presence of CO at 871° C. Analysis of the treated silica-titania sample at this point revealed the presence of large amounts of the halide on the support. Subsequently, these treated samples were exposed to dry air, also at 871° C., which released these halide groups by oxidation back to $I_2$ or $Br_2$ gas. The presence of each halogen ($Br_2$ or $I_2$) in the exit gas was confirmed by their dark red-brown or violet color. These samples were then impregnated with chromium and subjected to a second calcination as described above, resulting in a two-step activation. These two catalysts were found to be highly active for ethylene polymerization, and the resulting polymer was again recovered and analyzed.

In one aspect, this halide-dehydroxylation method can result in an enhancement in polymerization behavior as illustrated in Table 1. For example, this halide-dehydroxylation method significantly increased the melt index potential of the catalyst, so that polymer of lower MW was produced. However, it was observed that not all of the iodide was burned off during the activation process, because a small amount of a species survived the air treatment (even at 871° C.) to yield a yellow, highly reactive, paramagnetic surface species. Not intending to be bound by theory, this reactive species may be an iodate species of some type. The silica treated and activated in this manner exhibited a strong oxidizing capacity and reacted with many organic compounds.

Figure 9:
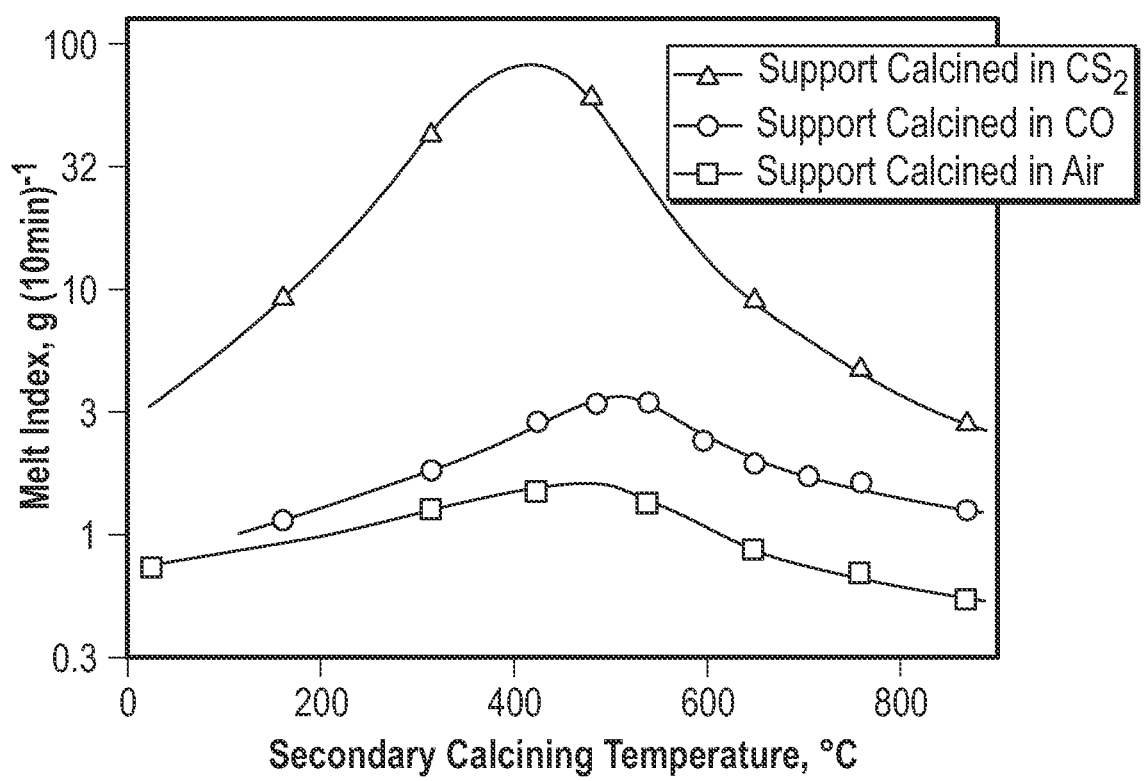
FIG. 9 plots the secondary calcining temperature versus melt index, showing that the 2-step activation process produced polymers of higher melt index when the silica-titania support was first calcined in CO or $CS_2$ rather than in air. Dehydroxylation as indicated by calcining in the gas shown at 870° C., followed by treatment with 1% Cr in hexane, then calcining in air at the temperature shown. The reaction temperature was 107° C.

Illustrated in FIG. 9 are the results of three series of two-step activations, each of which included one of the chemical dehydroxylation methods described above. For the FIG. 9 results, silica-titania (2.5 wt % Ti) was calcined at 871° C. in air, CO, or $CS_2$. Each support was impregnated with 1 wt % Cr as dicumenechromium(0) in hexane, and the samples were subsequently subjected to a second calcination in dry air at lower temperatures ranging from 160° C. to 871° C. These catalysts were tested at 107° C. for polymerization activity and the resultant polymer was recovered and analyzed.

FIG. 9 is a plot the melt index values of these polymers, against the second calcination temperature. In each series, FIG. 9 shows that a maximum melt index value was reached when the catalyst was oxidized at about 400° C. to 500° C. This behavior is similar to the data represented in FIGS. 4 and 5, although the melt index peak is shifted to higher temperatures in the FIG. 9 activations. At all the temperatures tested, the samples that were treated in CO produced polymers of higher MI than samples calcined only in air. Similarly, the samples calcined in $CS_2$ produced polymers of even higher melt index (note that the y-axis of FIG. 9 is a logarithmic scale). While not bound by theory, it is thought that the MI drop observed when the samples were oxidized at 500° C. to 900° C. is another indication that the titania-associated sites were thermally unstable, and tended to rearrange at the higher temperatures.

Table 2 provides data for the surface areas and pore volumes of silica samples calcined at various temperatures. The upper series in Table 2 represents samples calcined in air, whereas the lower series represents samples calcined in CO. Each sample was then impregnated with 1 wt % Cr as dicumenechromium(0) in pentane, followed by oxidation in air at 540° C. They were then tested for polymerization activity at 107° C. The onset on sintering is clearly shown in Table 2 by the precipitous drop in both surface area and pore volume, as seen in the air calcination data. However, when the calcination was carried out in CO this transition occurred only at higher temperatures and less severely that calcination in air. Therefore, the Table 2 data suggests that these enhanced dehydroxylation techniques tend to inhibit sintering. Another indication of sintering may be the drop in the melt index of polymers producing using the catalyst. For example, in one test, silica titanated to 1.5 Ti nm$^{-2}$ (that is, Ti atoms•nm$^{-2}$) lost 40% of its pore volume when calcined at 871° C. in air, but only 10% when calcined in CO. While not limited to any particular theory, this behavior suggests that surface OH groups, or traces of water vapor in the gas stream, may promote sintering (as in hydrothermal treatments), and their removal by reaction with CO may slow down the sintering process.

TABLE 2

Calcination in CO, instead of dry air or $N_2$,
inhibits the usual thermal sintering.
Cr/silica was calcined as shown below, then
impregnated with 1% Cr as dicumene Cr(0) in
pentane, then calcined at 540° C.
Sintering is evident by the drop in porosity, or polymer melt
index. Reaction temperature was 107° C.

| Temp. ° C. | Surf. Area $m^2 g^{-1}$ | Pore Vol. $mL g^{-1}$ | Melt Index $g (10 min)^{-1}$ |
|---|---|---|---|
| Calcined in CO | | | |
| 760° C. | 272 | 1.88 | 4.2 |
| 815° C. | 266 | 1.87 | 3.6 |
| 870° C. | 263 | 1.93 | 5.4 |
| 925° C. | 255 | 1.81 | 9.3 |
| 980° C. | 246 | 1.89 | 13.2 |
| Calcined in air | | | |
| 760° C. | 270 | 1.88 | 1.4 |
| 815° C. | 264 | 1.93 | 1.7 |
| 870° C. | 253 | 1.69 | 2.2 |
| 925° C. | 240 | 1.72 | 1.3 |
| 980° C. | 178 | 1.18 | 0.2 |

The melt indices of polymers produced using the catalysts of Table 2 were determined. The silica samples represented in Table 2 were subsequently impregnated with 1 wt % Cr as dicumenechromium in hexane, followed by a second calcination in air at 540° C. to oxidize the chromium. These catalysts were then tested for polymerization activity, the resultant polymer was recovered and analyzed, and the melt index values characterizing these polymers are shown in Table 2. Dehydroxylation in CO provided polymers of higher melt index than those obtained when the calcination was done in air. In each series, as the silica was calcined at progressively higher temperatures, the polymer melt index increased until the sintering point was reached. Then the melt index value declined at the higher calcination temperature, as was also observed in the one-step activation.

Commercial Aspects

In an aspect, a variation on the two-step activation process used for anhydrous impregnation of chromium can be used in commercial practice. In this aspect, virgin catalyst already containing the chromium can be subjected to one activation comprising, consisting essentially of, or consisting of two consecutive steps. First, the primary (dehydroxylation) step is conducted in a non-oxidizing atmosphere, which is used to minimize, reduce or prevent the lower-valent (lower oxidation state) chromium attachment to the support. Second, the temperature is maintained (FIG. 10) or lowered (FIG. 11A and FIG. 11B) and the reducing atmosphere is replaced by dry air, to oxidize, disperse and attach the chromium to the surface. In this process, only one calcination process is used which includes a high temperature dehydroxylation step in CO, $N_2$, $CS_2$, and the like, followed by a low-temperature oxidation and Cr attachment step in dry air. Therefore, this procedure provides an avenue for the same two-step activation chemistry used for anhydrous chromium impregnation, but without the anhydrous impregnation. Not bound by any particular theory, it is thought that large crystallites or domains of chromium may result from the first step, which requires a slightly higher temperature in the secondary step for full oxidation (or in some cases reoxidation).

Figure 10:
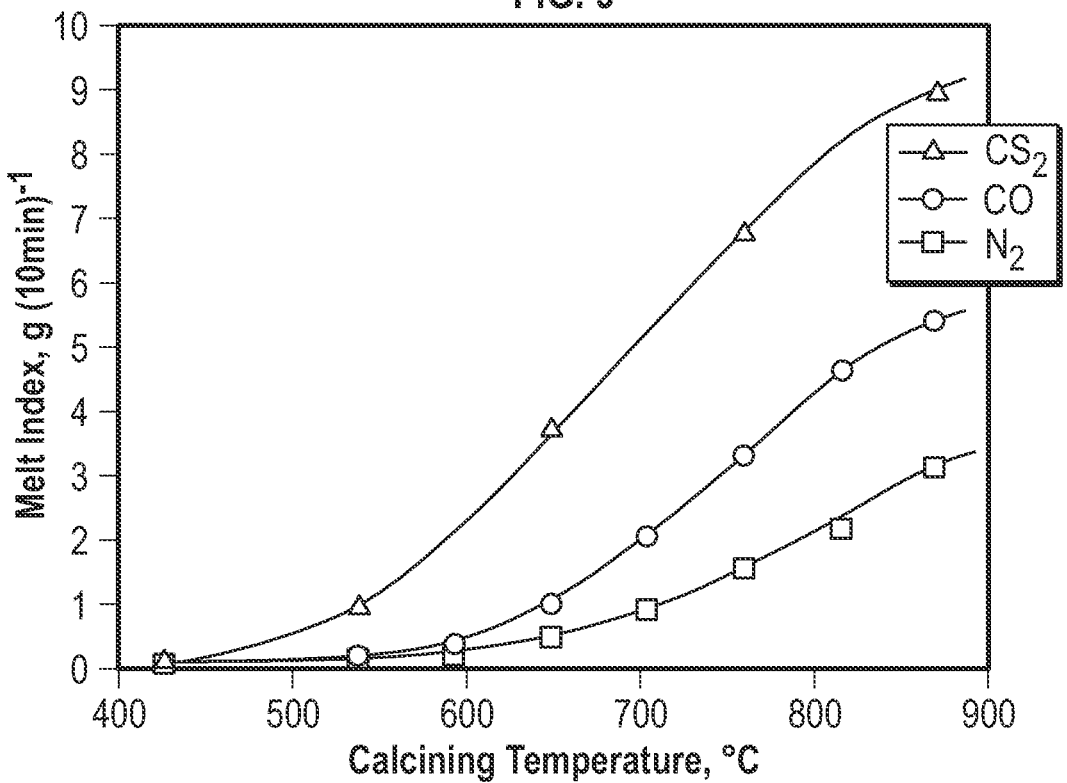
FIG. 10 shows calcining temperature versus melt index for Cr/silica-titania which was reduced at the temperature shown, in the atmosphere shown, for three hours, then reoxidized in air for 2 hours at the same temperature. Reduction in $CS_2$ produced polymers of the highest melt index.

FIG. 10 illustrates this approach and demonstrates some of the benefits of enhanced dehydroxylation. For the FIG. 10 data, Cr/silica-titania (2.5 wt % Ti) was calcined at various temperatures for 3 h in a non-oxidizing atmosphere ($N_2$, CO, or $CS_2$), followed by 2 h in dry air at the same temperature. These catalysts were then tested for polymerization activity, and the resultant polymers were analyzed. In all three cases the polymer melt index increased as the catalyst calcination temperature was raised. Because of enhanced dehydroxylation, calcination in $CS_2$ resulted in higher MI values than calcination in CO, calcination in CO resulted in higher MI values than calcination in $N_2$. Of course, the $N_2$ treatment would be correspond to a one-step activation, because in this case both the primary and secondary steps were conducted at the same temperature.

Figure 11A:
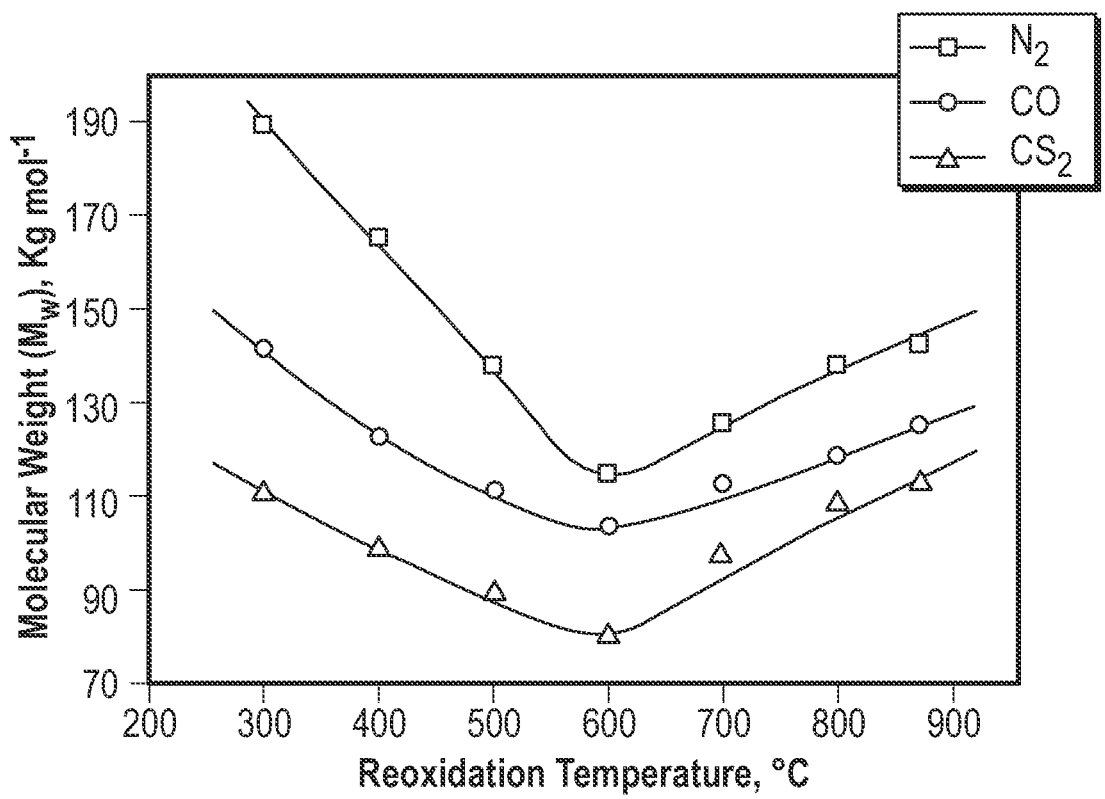
FIG. 11A and FIG. 11B present data for molecular weight (FIG. 11A) and fluidity (FIG. 11B) as a function of reoxidation temperature, for a commercial two-stage activation, as follows. Cr/silica-titania was calcined for three hours at 871° C. in $N_2$, CO, or $CS_2$, then in air for two hours at the temperature indicated. The MW and the fluidity (similar to melt index) of the resultant polymers are plotted. Fluidity is the inverse of the melt viscosity, measured at 0.1 $s^{-1}$.
Figure 11B:
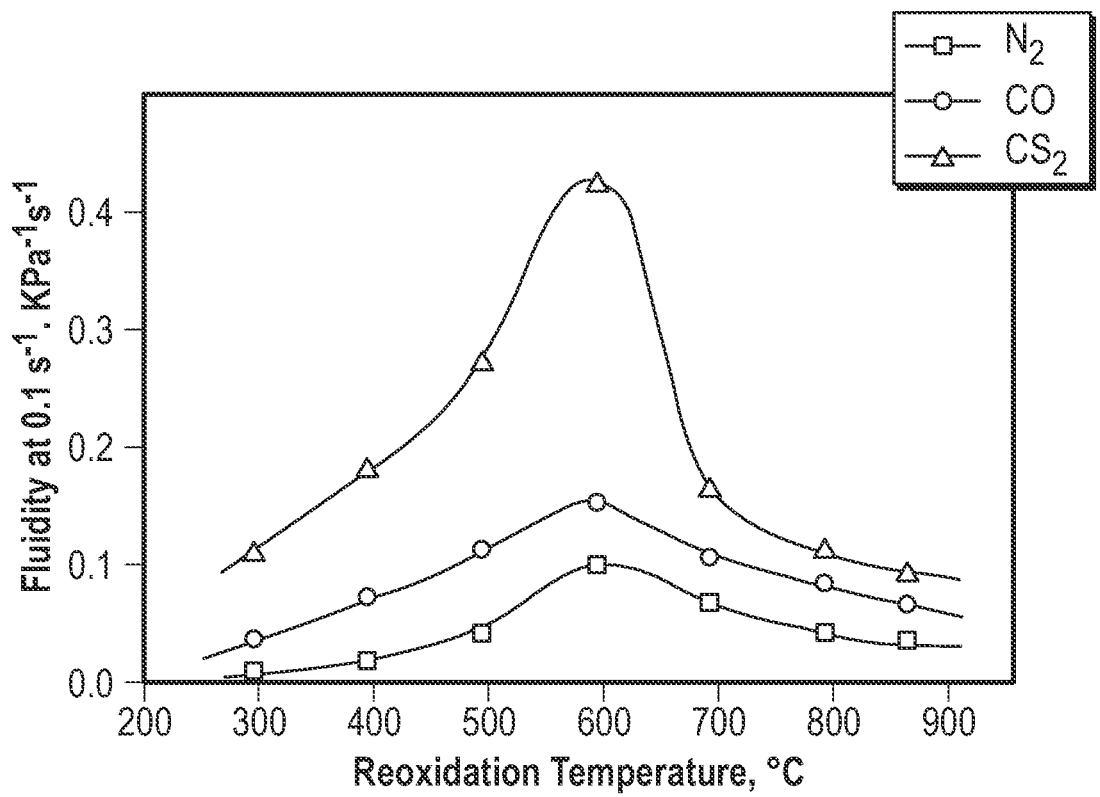

FIG. 11A and FIG. 11B provides polymer data for catalyst activations in which the secondary (chromium-attachment) step is conducted at a lower temperature than the primary (dehydroxylation) step. In FIGS. 11A and 11B, Cr/silica-titania (2.5 wt % Ti) was calcined in $N_2$, CO, or $CS_2$, but always at 871° C. The temperature of the secondary step in air was varied from 300° C. to 900° C. These catalysts were then tested for ethylene polymerization and the resultant polymers were analyzed. Instead of melt index, FIG. 11A shows the molecular weight, which went through a minimum, and the fluidity shown at FIG. 11B, which went through a maximum as a function of the treatment temperature. Both extremes in molecular weight and fluidity occurred when the catalysts were oxidized at about 600° C. Like melt index, fluidity indicates how easily the molten polymer flows at low shear rates. Fluidity is the inverse of melt viscosity, and like MI it varies inversely with molecular weight.

Thus, each response went through a peak, which we may refer to as an optimum, similar to the response seen from the anhydrous impregnation method, as shown in FIG. 9. However, the optimum second treatment temperature was slightly higher in this case as compared to the anhydrous impregnation method. Not bound by any particular theory, this observations may perhaps indicate greater difficulty in oxidizing the chromium and dispersing the Cr(VI). In this example, the response was maximized when the dehydroxylation occurred at 871° C. and the Cr(VI) dispersion occurred at about 600° C. Note that the 871° C. data points in FIG. 11A and FIG. 11B correspond to the 871° C. points in FIG. 10.

If the reduced catalyst is left with large crystallites of $\alpha$-$Cr_2O_3$ (detectable by X-ray diffraction), reoxidation at 750° C. or a higher temperature may be required to obtain maximum melt index in the resultant polymer, because this form of chromium may be more difficult to oxidize and disperse. In this aspect, the method by which the catalyst is initially heated to the dehydroxylation temperature may determine the desired optimum oxidation temperature later. For example, and while not bound by theory, the presence of water vapor during the initial heating, or the presence of Cr(VI) during the heating in $N_2$, may encourage the growth of $\alpha$-$Cr_2O_3$ crystallites, and Cr(VI) may act as a flux in the growth of such crystallites. Thus, if the thermal ramp to 871° C. is in $N_2$, even if followed by CO at 871° C., differences in performance were observed depending upon whether the virgin catalyst contained chromium that was hexavalent Cr(VI) or trivalent Cr(III). It is thought that the former tends to produce larger $\alpha$-$Cr_2O_3$ crystallites. Moreover, if a catalyst containing trivalent chromium is heated to 600° C. in dry air, which forms Cr(VI), then in $N_2$ to 871° C., this treatment also promotes the growth of large crystallites that are more difficult to reoxidize later.

Figure 12:
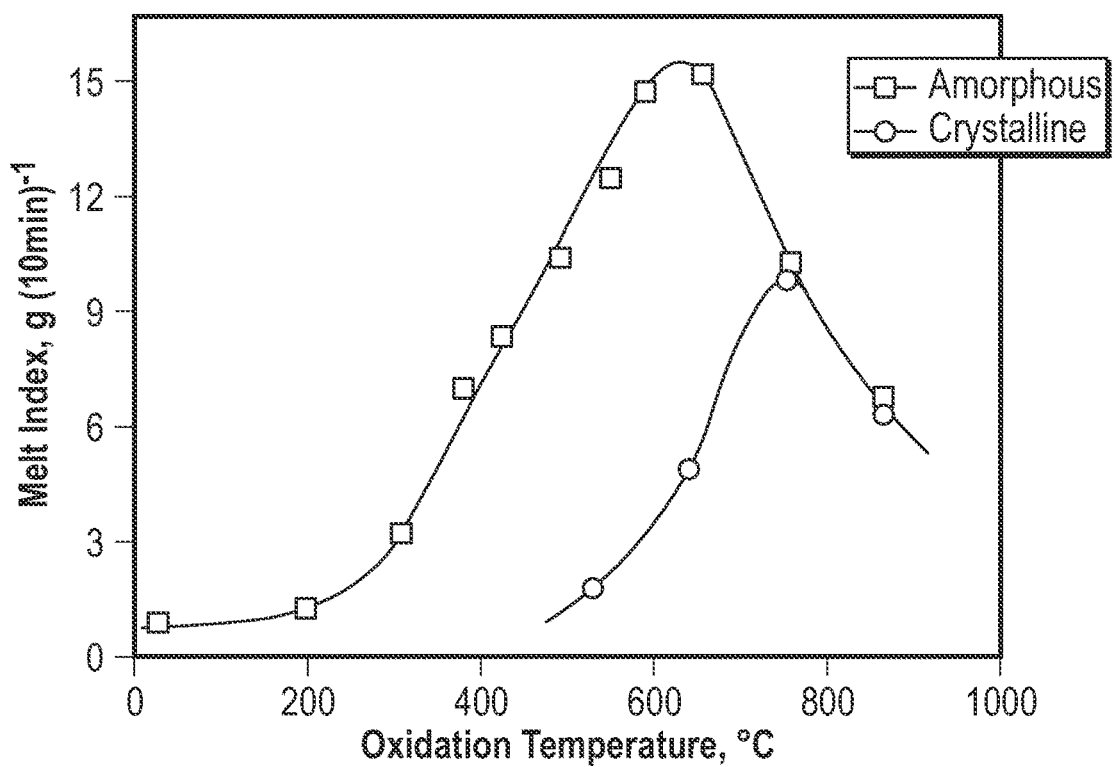
FIG. 12 shows a plot of oxidation temperature versus melt index for two reduction and reoxidation or "R&R" activations of Cr(III)/silica-titania which produce different results. The upper line for Amorphous: raised to 870° C. in $N_2$. For the crystalline sample, the temperature was raised to 650° C. in air, then 870° C. in $N_2$, to form $\alpha$-$Cr_2O_3$. Both the crystalline and amorphous samples were then treated in CO at 870° C. for three hours, followed by two hours in dry air at the temperature shown. The crystalline catalyst was more difficult to reoxidize and therefore produced polymers of lower melt index, as shown by the crystalline catalyst (bottom curve) requiring a higher temperature (750° C.) than did the amorphous catalyst (650° C.) to achieve maximum melt index in the polymer.

While not intending to by bound by theory, FIG. 12 is believed to show data reflecting—$Cr_2O_3$ crystallite formation. The upper curve in FIG. 12 represents Cr/silica-titania that was heated to 870° C. in $N_2$. The lower curve (FIG. 12) represents the same catalyst but heated to 650° C. in air, which creates Cr(VI), then to 870° C. in $N_2$, which allows decomposition of Cr(VI) to $\alpha\text{-}Cr_2O_3$. Subsequently, each catalyst was held in CO at 870° C. for 3 h followed by oxidation in air for 2 h at the temperature indicated in FIG. 12. These catalysts were then tested and the resultant polymer was analyzed. The crystalline catalyst (bottom curve) required a higher temperature (750° C.) than did the amorphous catalyst (650° C.) to achieve maximum melt index in the polymer. It is seen that a higher oxidation temperature also diminished the magnitude of the melt index (MI) enhancement. Thus, the amorphous catalyst was oxidized more easily, requiring lower temperature, and consequently it produced polymer of higher melt index than the crystalline catalyst. At temperatures above 750° C., when the $\alpha\text{-}Cr_2O_3$ crystallites are finally oxidized and dispersed, the two curves are seen to correspond.

As illustrated in FIG. 11A and FIG. 11B, $CS_2$ was the most effective atmosphere for dehydroxylation in this activation procedure, just as it was in the anhydrous impregnation technique as shown in FIG. 9. In the FIGS. 11A and 11B experiment, one series of catalysts was calcined in air, another in CO, and still another in $CS_2$, each at 871° C. A black chromium sulfide material formed when chromium-containing catalysts were reduced in $CS_2$, COS, or other organic sulfur compounds. However, the second calcination in air easily oxidized the chromium sulfide material back to Cr(VI) oxide, and no sulfur was then detected on the final catalyst.

It is observed that sulfur treated catalysts may display a more intense orange or even red color after the final oxidation. While not intending to be bound by theory, it is thought that the cause of the red color may indicate the formation of high levels of dichromate, because dehydroxylation may favor the dichromate species. The red color may be associated with the use of sulfides to obtain more extreme levels dehydroxylation. Exposing a sulfur-treated catalyst to water vapor completely reversed the melt index benefit. Organic compounds of selenium and tellurium promoted the catalyst as much as the sulfur compounds did.

Figure 13:
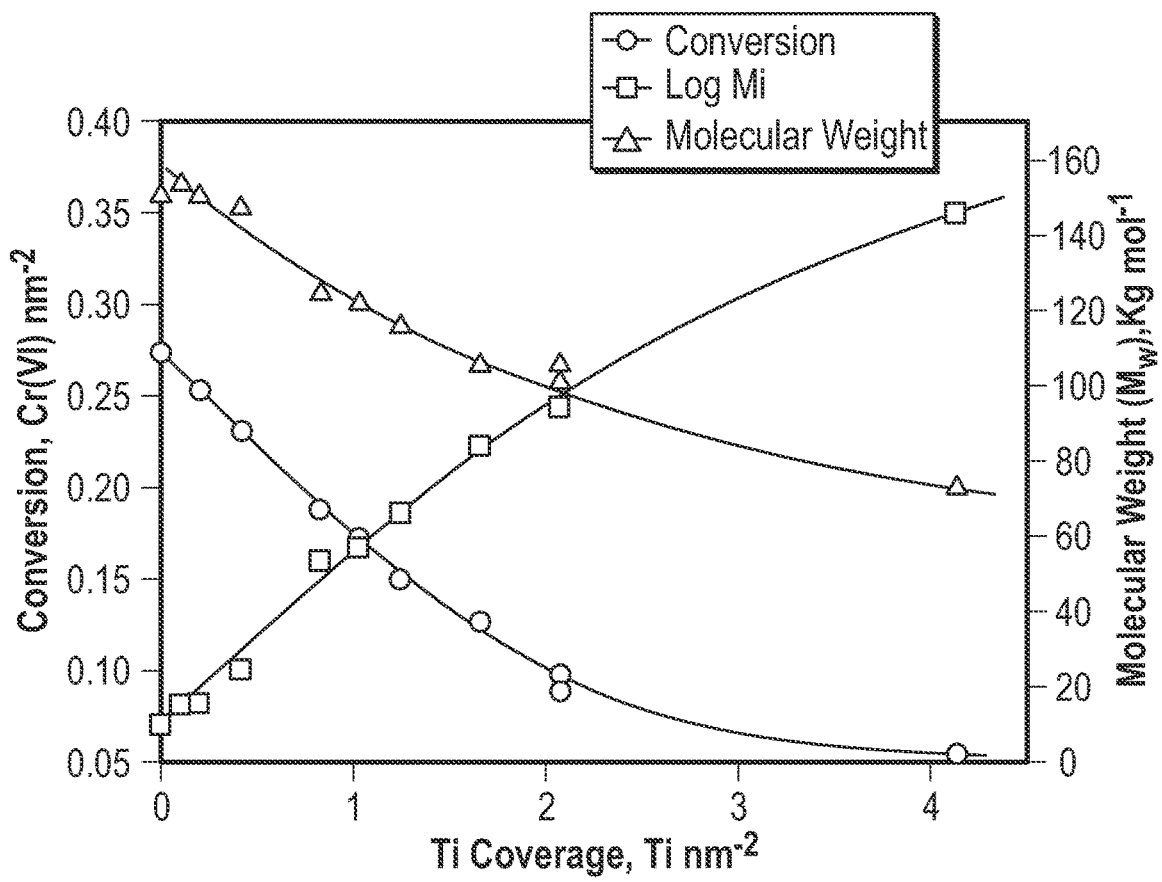
FIG. 13 illustrates the conversion to Cr(VI) as a function of titanium (Ti) coverage. Although the presence of Ti during reduction and reoxidation (R&R) activation greatly lowers the polymer MW and raises its melt index (MI), Ti also destabilizes the Cr and thus lowers the conversion to Cr(VI). These data are for titanated Cr/silica, heated in CO at 871° C., then air at 600° C.

Another indication that the titania-associated sites are less stable at high temperature was observed by measuring the Cr(VI) concentration on catalysts activated by the two-step process. FIG. 13 represents a series of Cr/silica catalysts that were titanated to various levels, then activated by the commercial two-stage approach disclosed herein. Specifically, these catalysts they were heated to 871° C. in CO and held at that temperature 3 h, then subsequently oxidized in air at 600° C. for 2 h. These catalysts were tested for polymerization activity, and the resultant polymers were analyzed. FIG. 13 provides a plot of the logarithm of the polymer melt index against the titania loading on the catalyst, and FIG. 13 can be compared with FIG. 6, representing the anhydrous impregnation of chromium. In each figure a strong response of the polymer melt index to the titania content of the catalyst is observed. This trend is confirmed by the MW of the polymer, which is also shown in FIG. 13.

Thus, this data suggests that there is a strong tendency to make titania-associated sites by each of the disclosed procedures. The Cr(VI) coverages of the catalysts in FIG. 13 were determined and are also shown in FIG. 13. Conversion to Cr(VI) became less efficient with the addition of titania, indicating less stability at 600° C. These values can be compared with the starting chromium loading of 0.38 Cr atoms $nm^{-2}$. At high titania loadings (3-4 Ti atoms $nm^{-2}$) the catalyst was found to contain almost no Cr(VI).

Figure 14:
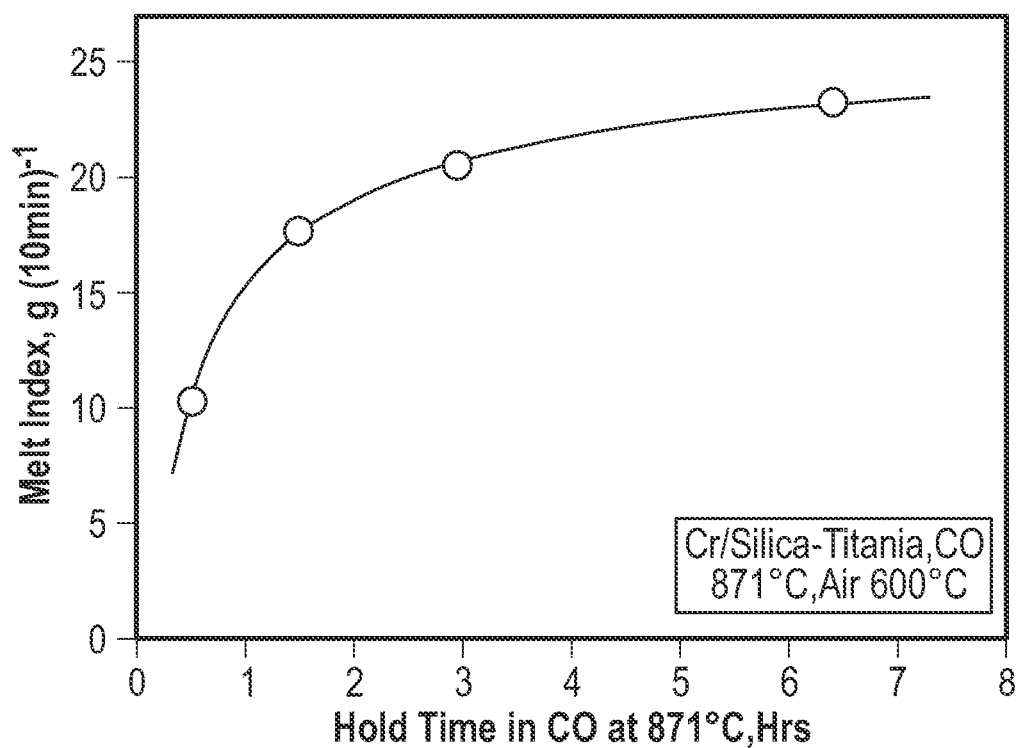
FIG. 14 provides a plot of reoxidation temperature versus melt index for a commercial two-stage activation, showing that the dehydroxylation step in CO is time dependent, so that longer hold times result in a polymer of higher melt index. The calcination time in CO at 871° C. was varied from 0.5 to about 7 h.

It may be appreciated that when silica is heated in air, it does not become dehydroxylated immediately as an annealing process is involved that can take up to 24 h to reach equilibrium, depending upon the temperature. In a series of experiments illustrated in FIG. 14, the calcination time in CO at 871° C. was varied from 0.5 to about 7 h to determine whether this form of dehydroxylation is also time dependent. The curve in FIG. 14 shows the dehydroxylation process approaching equilibrium in about 12 h, which is approximately similar to the time observed when the calcination was done in air. Thus, it appears that surface mobility may be operating for dehydroxylation, even in the presence of CO.

In an aspect, for the redistribution of the chromium to take place using activation by reduction and reoxidation, also termed "R&R" activation, a sufficiently "detached" chromium is thought to be beneficial upon entering the oxidation step. For example, the chromium on the usual virgin catalyst, Cr(III)/silica, is already sufficiently detached from the surface, and heating it in $N_2$ or CO will not change this non-attached status. However, if the Cr(III)/silica is first oxidized to Cr(VI)/silica, such as during a heat-up step in air, the chromium can become bonded to the silica surface. Therefore, for the R&R activation, the chromium can be sufficiently detached from the surface during the dehydroxylation treatment in $N_2$ or CO to assist in redistributing the Cr(VI) during the final oxidation step.

In this aspect, Table 3 provides data that compares a conventional activation of Cr/silica in air at 871° C. before (row 1) and after (row 2) reduction in CO and reoxidation in air, both at 350° C. These catalysts were then tested and the resultant polymers analyzed, and it was observed that there was no MI enhancement. It is thought that this reduction treatment did not sufficiently detach the chromium to cause a redistribution of the chromium during the subsequent air treatment at 350° C. Further, this treatment did not give the MI boost as in a two-step activation. However, when the Cr(II) catalyst was subsequently treated in $N_2$ at 871° C. (row 3), followed by oxidation at 350° C., an MI enhancement was observed. Therefore while not bound by theory, it is believed that this $N_2$ treatment at 871° C. may involve some chromium rearrangement (perhaps into larger domains), but it does not appear to cause any further dehydroxylation. Nevertheless, this treatment yielded a large MI enhancement in the polymer which is characteristic of the two-step activation (Table 3). Once Cr(VI) is formed, high temperatures are apparently favorable to detach the chromium.

TABLE 3

When Cr(VI) is reduced during the R&R (reduction and reoxidation) process, high temperature is needed in order to detach the Cr from the surface and allow it to then re-attach during the reoxidation step.

| 5 hour Treatment | Melt Index* |
|---|---|
| Air 871° C. | 4.9 |
| Air 871° C., CO 330° C., Air 330° C. | 5.0 |
| Air 871° C., CO 350° C., $N_2$ 871° C., Air 650° C. | 8.4 |

*g (10 min)$^{-1}$

Figure 15:
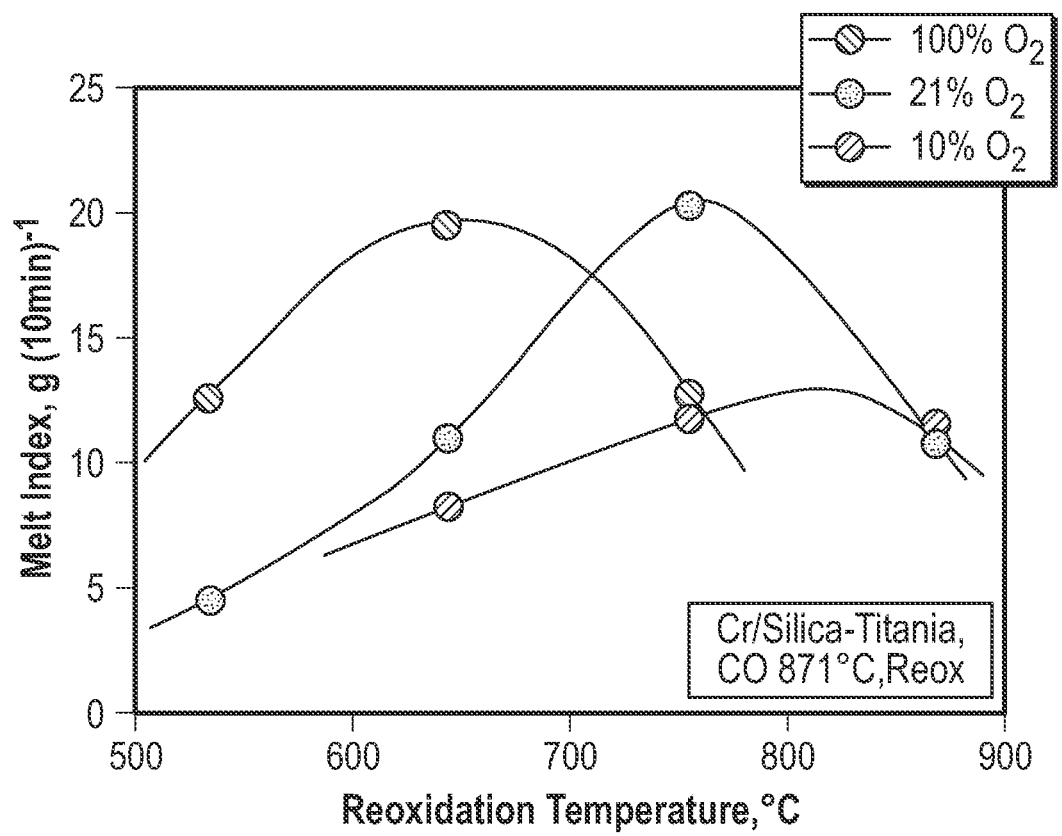
FIG. 15 plots the reoxidation temperature versus melt index in a commercial two-stage activation, where the reoxidation step is more efficient if it is carried out in an atmosphere of high $O_2$ concentration. This plot shows the melt index values of polymers obtained from Cr/silica-titania that was reduced in CO at 871° C., and subsequently reoxidized at various temperatures in varying amounts of oxygen.

Not bound to any particular theory, it is thought that the degree of clumping that occurs during this detachment may affect or determine how severe a reoxidation treatment is required. The temperature required for reoxidation may also be dependent upon the reoxidation atmosphere. In an aspect, FIG. 15 shows the melt index values of polymers obtained from Cr/silica-titania that was reduced in CO at 871° C., and subsequently reoxidized at various temperatures in varying amounts of oxygen. A high temperature (820° C.) was needed for optimum reoxidation when the atmosphere contained only 10% $O_2$. However, the required reoxidation temperature dropped to 760° C. when the treatment was in 21% $O_2$, and to only 630° C. when it was in 100% $O_2$. Thus, more oxygen in the atmosphere tended to reoxidize and redisperse the chromium at lower temperatures.

When a catalyst activated by the two-step procedure was then reduced in CO at 350° C., the advantages of the two-step activation appeared to be diminished or even lost. For example, the MW distribution was changed so that the low-MW shoulder was lost. While not bound to any particular theory, this finding may indicate that the final reduction step provides an opportunity for these thermally unstable, titania-associated sites to migrate back to the usual configuration. This behavior provides still more evidence that the two-step activation preferentially deposits Cr(VI) onto the titania, leaving an unusually high population of titania-associated sites.

In a further aspect, the time used in the final treatment in air can affect the resulting melt index, with short oxidation times providing good improvements in melt index. This behavior may be due to the occupation of acidic sites, which are perhaps the most reactive initially. While not bound by theory, it is thought that longer hold times in air at high temperatures may allow the initially formed Cr(VI) species to migrate to lower-energy surface positions, perhaps more basic sites, which lowers the MI potential. In this aspect, Table 4 presents some examples of the influence of time during the second step, where oxidation times as short as 5 minutes can be seen to produce some exceptional improvements in melt index. In Table 4 and throughout, h is hours and min is minutes.

TABLE 4

The influence of oxidation time

| Activation Protocol* | Induction Time (min) | Productivity g/g | Activity g/g-h | HLMI dg/min | $I_{10}$ dg/min | MI dg/min |
|---|---|---|---|---|---|---|
| Air to 650° C., hold 3 h | 13 | 2855 | 2577 | 29.7 | 6.3 | 0.4 |
| $N_2$ to 650° C., hold 12 h, Air 650° C. 15 min | 5 | 2750 | 2538 | 77.2 | 16.5 | 1.1 |
| $N_2$ to 650° C., hold 3 h, Air 500° C. 1 h | 8 | 2789 | 1743 | 69.0 | 14.2 | 0.8 |
| $N_2$ to 650° C., hold 12 h, Air 500° C. 33 min | 5 | 2782 | 2649 | 97.8 | 20.3 | 1.4 |
| $N_2$ to 650° C., hold 12 h, Air 500° C. 5 min | 5 | 3099 | 2113 | 252 | 53.0 | 3.34 |
| $N_2$ to 650° C., hold 12 h, Air 400° C. 18 min | 14 | 423 | 163 | 23.8 | 4.13 | 0.15 |
| $N_2$ to 650° C., hold 12 h, Air 400° C. 18 min | 16 | 519 | 599 | 21.6 | 4.07 | 0.15 |
| $N_2$ to 650° C., hold 12 h, Air 400° C. 48 min | 3 | 1899 | 797 | 258 | 47.3 | 3.55 |

*catalyst, 3.5% Ti; reaction 105° C., 3.8 mPa; h, hours; min, minutes

The activation methods disclosed herein have been developed where high melt index may be desired in chromium catalysts. For example, using conventional air activation conditions, a melt index of 3 may be considered an achievable melt index result from Magnapore catalyst. In contrast, the disclosed activation treatments disclosed herein provide polymers having higher melt index values, for example around 30 MI (g/10 min, in commercial reactors. Activation with CO is observed to provide good commercial results with the highest MI polymers being produced. However, additional methods are disclosed that also can produce higher MI polymers.

In a further aspect, the disclosed activation treatments can be used to provide additional advantages beyond simply a higher melt index of the polyethylene. For example, high MI potential can be converted into higher productivity by, for example, raising the ethylene concentration, or can provide better settling efficiency, or can provide lower the reactor temperature and achieve higher solids. The disclosed activation methods also can be used to shorten activation time, and therefore to increase activator capacity.

EXAMPLES

Aspects of the invention may be further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Two commercially available chromium catalysts were selected, a Cr/Ti-coated silica (catalyst A) and a simple Cr/silica (catalyst B). Catalyst A was prepared from a silica having a surface area of about 450 $m^2/g$, a pore volume of about 1.55 mL/g, and an average particle size of about 80 microns. This silica was heated under nitrogen purge for 3 hours at 200° C., cooled to ambient temperature, and then impregnated with 1 wt % Cr (as chromium (III) acetate) in methanol solution. The methanol was evaporated and then the obtained Cr/silica was impregnated with 3.0–3.3% Ti as a heptane solution of titanium propoxide. After the heptane was evaporated under a nitrogen purge at about 120° C., the finished catalyst was calcined as described hereinbelow.

Various titanium compounds that can be used for the impregnation of silica in preparing catalysts according to this disclosure include, but are not limited to, titanium(IV) ethoxide (Ti(OEt)$_4$), titanium(IV) isopropoxide (Ti(O-i-Pr)$_4$), titanium(IV) n-propoxide (Ti(O-n-Pr)$_4$), titanium(IV) n-butoxide (Ti(O-n-Bu)$_4$), titanium(IV) (triethanolaminato) isoproxide, titanyl acetylacetonate, titanium diacetylacetonate diisopropylate, alkyl esters of titanium, and the like. In addition, various Ti(III) compounds also may be used for the impregnation of silica in preparing catalysts according to this disclosure.

The Cr/silica catalyst B was purchased from W. R. Grace under the trade name 969MS. It is characterized by a 0 wt % titanium content, a surface area of about 300 m²/g, a pore volume of about 1.60 mL/g, an average particle size of about 100 microns, and a chromium loading of 1.0 wt %.

Polymerization runs were carried out in a 2.2 liter steel reactor equipped with a marine stirrer rotating at 500 rpm. The reactor was surrounded by a steel jacket through which was passed a mixture of steam and water, which was adjusted to maintain a constant temperature of 105° C.±0.5° C. with the help of electronic control instruments.

weighed. Activity was specified as grams of polymer produced per gram of solid catalyst charged per hour.

Table 5 provides a series examples in which 50-mL samples of these catalysts were activated in the laboratory activator tube described above according to a specific activation protocol, and a catalytic olefin polymerization run was carried out to examine the properties of the catalyst and resulting polymer provided by that catalyst activation. Two catalysts were used in the Table 5 examples: catalyst A (Cr/Ti-coated silica, 3.2% Ti) and catalyst B (Cr/silica).

TABLE 5

Example catalyst activations and associated catalyst and polymer properties. [A]

| Example | Catalyst | Activation Parameters | Cr(VI) (wt %) | Induction Time (min) | Productivity (g/g) | Activity (g/g-h) | HLMI (dg/min) | $I_{10}$ (dg/min) | MI (dg/min) | HLMI/MI |
|---|---|---|---|---|---|---|---|---|---|---|
| 1 | A | N₂ to 650° C., hold 3 h<br>N₂ to 500° C., Air 1 h | 0.45 | 8 | 2789 | 1743 | 69.0 | 14.2 | 0.8 | 82 |
| 2 | A | Air to 370° C., hold 1.5 h<br>N₂ to, 650° C., hold 12 h<br>N₂ to 650° C., air 15 min | 0.33 | 5 | 2750 | 2538 | 77.2 | 16.5 | 1.1 | 73 |
| 3 | A | Air to 370° C., hold 1.5 h<br>N₂ to 650° C., hold 12 h,<br>N₂ to 500° C., air 33 min | 0.41 | 5 | 2782 | 2649 | 97.8 | 20.3 | 1.4 | 70 |
| 4 | A | Air to 370° C., hold 1.5 h<br>N₂ to 650° C., hold 12 h<br>N₂ to 400° C., air 18 min | 0.38 | 14 | 423 | 163 | 23.8 | 4.13 | 0.15 | 161 |
| 5 | A | Air to 370° C., hold 1.5 h<br>N₂ to 650° C., hold 12 h<br>N₂ to 400° C., air 18 min | 0.36 | 16 | 519 | 599 | 21.6 | 4.07 | 0.15 | 145 |
| 6 | A | Air to 370° C., hold 1.5 h<br>N₂ to 650° C., hold 12 h<br>N₂ to 400° C., air 48 min | 0.43 | 3 | 1899 | 797 | 258 | 47.3 | 3.55 | 73 |
| 7 | A | N₂ to 650° C., hold 12 h<br>N₂ to 500° C., air 5 min | 0.26 | 5 | 3099 | 2113 | 252 | 53.0 | 3.34 | 76 |
| 8A Control | A | Air to 650° C., hold 15 h | 0.87 | 12 | 2800 | 2300 | 28.2 | 6.3 | 0.34 | 83 |
| 8B Ref | A | Air to 675° C., hold 3 h | 0.88 | 10 | 2960 | 2870 | 24.4 | 5.5 | 0.18 | 135 |
| 9 | B | N₂ to 700° C., hold 8 h<br>N₂ to 600° C., air 15 min | 0.62 | 11 | 3050 | 3050 | 17.7 | 3.1 | 0.07 | 253 |
| 10 | B | N₂ to 800° C., hold 8 h<br>N₂ to 650° C., air 30 min | 0.34 | to | 2476 | 3032 | 42.7 | 8.2 | 0.37 | 116 |
| 11 | B | N₂ to 840° C., hold 9 h<br>N₂ to 550° C., air 30 min | 0.37 | 5 | 1596 | 1368 | 54.6 | 10.9 | 0.65 | 84 |
| 12A | B | N₂ to 840° C., hold 9 h<br>N₂ to 600° C., air 15 min | 0.27 | 14 | 3055 | 1852 | 54.1 | 10.8 | 0.54 | 101 |
| 12B | B | N2 to 800° C., hold 3 h<br>N₂ to 600° C., air 30 min | 0.45 | 10 | 3094 | 2292 | 63.0 | 13.2 | 0.75 | 84 |
| 13A Control | B | Air to 788° C., hold 15 h | 0.77 | 16 | 2940 | 2543 | 16.3 | 326 | 0.16 | 101 |
| 13B Ref | B | Air to 800° C., hold 3 h | 0.75 | 13 | 2883 | 2662 | 35.0 | 7.8 | .30 | 117 |

[A] Catalyst A = Cr/Ti-coated silica; Catalyst B = Cr/silica; h = hours; min = minutes.

Unless otherwise stated, a small amount (about 0.01 to 0.10 gram) of the solid catalyst was first charged under nitrogen to the dry reactor. Next, 1.2 liter of isobutane liquid was charged and the reactor was heated up to the specified temperature of 105° C. Finally, ethylene was added to the reactor to equal a fixed pressure, normally 550 psig, which was maintained during the experiment. Stirring was allowed to continue for the specified time, usually around one hour, or until about 3,000 grams of PE was produced per gram of catalyst, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and As Table 5 illustrates, activation protocols were varied and the resulting polymer properties are compared. Two control runs are shown in Table 5 for comparison, in which longer conventional activation times were used for catalyst activation. The examples in Table 5 were activated in a fluidized bed using the following parameters: catalyst charged, 50 mL (10–20 g); heating ramp rate is 4° C./min, gas velocity 0.05 ft/sec; and cooling ramp rate is about 2° C./min using the gases specified in the table. The activator tube itself was a quartz 2-inch diameter tube with a sintered-quartz distribution plate fused into the structure across the tube. The tube also had a thermo-well which allowed a thermocouple to be placed inside the bed to read the temperature.

The Activation Parameters column in Table 5 includes the fluidizing gas, hold temperatures, and hold times. For activation examples listing two gases (N₂, air), the Activation Parameters in Table 5 indicate the activation sequence shown. At the end of each activation, the catalyst was then removed from the furnace and flushed with nitrogen gas before storage for use.

The data in Table 5 illustrates a substantial increase in HLMI in the examples in which the catalysts is activated according to this disclosure, versus the HLMI of the polymers obtained from the comparative catalyst runs, when the air oxidation step is sufficient. For example, the catalyst A Examples 1-3 and 6-7 show substantially increased HLMI from the catalyst A control Examples 8A and 8B. Examples 4 and 5 demonstrate that that relatively low air activation temperature ($T^2$) of 400° C. for 18 minutes ($t^{H2}$) does not provide sufficient activation to attain the increased HLMI over the control Examples 8A and 8B. However, a longer hold times in air of 48 minutes ($t^{H2}$) at an air activation temperature ($T^2$) of 400° C. does activate the catalyst to provide the substantially increased HLMI in the resulting polyolefin from the control Example 8.

Similarly, for the catalyst B Examples 10-12B, a substantially increased HLMI from the catalyst B control Examples 13A and 13B is seen. The Example 9 activation as compared the Examples 10-12B activations includes a lower N₂ activation temperature ($T^1$) and/or a lower air activation temperature ($T^2$) and shorter time ($t^{H2}$) and the resulting polymer does not attain a comparable increased HLMI over that of Examples 10-12B. As compared with the catalyst B control Examples 13A and 13B, the Example 9 HLMI is only slightly increased over that polymer of control Example 13A.

Examples 14-17

Table 2 shows some examples of activation profiles affording to this disclosure and the total time to complete the activation. All of these activations are seen to be shorter than the typical 30 hour control activation in conventionally-activated catalysts.

TABLE 6

Example catalyst activation times and temperatures.

| | Example | | | |
|---|---|---|---|---|
| Activation Parameter | 14 | 15 | 16 | 17 |
| Starting temperature, ° C.$^A$ | 300 | 300 | 200 | 250 |
| Hold Temperature, ° C. ($T^1$) | 650 | 840 | 650 | 870 |
| Ramp rate, ° C./min ($RR^1$) | 2.00 | 3.00 | 2.00 | 3.00 |
| Ramp time, h | 2.92 | 3.00 | 3.75 | 3.44 |
| Hold time at maximum temperature, h ($t^{H1}$) | 6.00 | 3.00 | 4.00 | 1.00 |
| Cooling ramp rate, ° C./min | 3.00 | 3.00 | 3.00 | 3.00 |
| Oxidation time (air), h ($t^{H1}$) | 0.50 | 0.20 | 1.00 | 0.08 |
| Total activation cycle, h$^B$ | 12.4 | 9.2 | 11.8 | 7.5 |

$^A$The starting temperature above ambient indicates that the activation vessel was already hot from prior activations when charged with the catalyst to be activated.
$^B$Following the oxidation hold time ($t^{H2}$), the catalyst was allowed to cool to around 400° F. (about 204° C.) before being dumped in a hopper.

The Examples of Table 6 demonstrate the much shorter total activation cycle as compared to the 24 h to 30 h total activation cycle time in conventionally activated catalysts. Further, as was demonstrated in the Table 5 data, the resulting polyolefin from the disclosed activation process can provide higher HLMI values than the conventionally activated catalysts can provide.

The following examples (Examples 18-20) demonstrate a commercial scale activation in which 500 lbs (pounds) of catalyst A (3.0 wt % Ti) were charged under nitrogen flow at about 0.1 ft/sec, to a 48-inch activator vessel that was already heated to 600° F.

Example 18

In Example 18, after charging the catalyst, the temperature was raised to 750° F. (399° C.) while the catalyst was allowed to fluidize in nitrogen at a flow rate of about 0.24 ft/sec. After four hours under this condition, the nitrogen was changed to a mixture of 50% nitrogen and 50% air for three minutes (min). Temperature began rising and soon reached 785° F. (418° C.) without any additional heat being applied. Then the atmosphere was changed back to 100% nitrogen, and over about 15 min the temperature cooled back to 750° F. (399° C.). Then the atmosphere was changed back again to 50% nitrogen and 50% air for three minutes. This time the temperature only rose to 770° F. (410° C.). The gas was changed back to 100% nitrogen and in 10 min the temperature cooled back down to 750° F. (399° C.). A third 3-min exposure to 50% nitrogen and 50% air brought the temperature to 770° F. (410° C.). A fourth cycle resulted in an exotherm to 765° F. (407° C.) and this time it cooled even without taking out the 50% nitrogen and 50% air. While not intending to be bound by theory, this observation is believed to reflect that most of the organics on the catalyst had now been oxidized and removed. Then the atmosphere was changed back to pure 100% nitrogen and the temperature was heated up to 1250° F. (677° C.) at a ramp rate of 2.7° F./min and with a gas velocity of 2.4 ft/sec. The catalyst was allowed to fluidize at this temperature in nitrogen for another 6 hours, and then a sample was taken for later analysis (sample 18A).

Following this treatment, the catalyst temperature was brought down to 950° F. (510° C.) under 2.4 ft/sec nitrogen flow (cooling rate was normally about 200° F./hour). At this temperature, the atmosphere was changed to 100% air (2.4 ft/sec). An exotherm (no additional heat applied) was observed which rose up to 1020° F. (549° C.) in about 5 minutes. Within the next 10 min, however, the temperature had dropped back to 950° F. (510° C.). It was allowed to continue cooling in air at the rate of 5.2 F/min. When the temperature reached 650° F. (343° C.) the atmosphere was again changed back to pure nitrogen and the catalyst was purged for about 2 hours as the temperature finally dropped to and was held at 600° F. (316° C.). It was discharged and stored under nitrogen. A sample (sample 18B) was taken from the vessel for testing. The results are shown in Table 7.

TABLE 7

| Example | 18 | 18 | 19 | 8B | 70 |
|---|---|---|---|---|---|
| Catalyst | A (18B) | A (18B) | A | A | A |
| Run No. | 18-1 | 18-2 | 19 | 8B | 70 |
| Productivity, g/g | 2156 | 1673 | 2620 | 2960 | 3240 |
| Activity, g/g-h | 1454 | 1362 | 2878 | 2870 | 3780 |
| HLMI, dg/min | 47.9 | 47.3 | 24.2 | 24.4 | 46.2 |
| MI, dg/min | 0.65 | 0.53 | 0.24 | 0.18 | 0.55 |
| HLMI/MI | 73.7 | 89.7 | 99.7 | 135 | 84.0 |
| Wt % Cr (VI) | 0.30% | 0.30% | 0.80% | 0.88% | 0.47% |

Example 19

Also shown in Table 7 is a control run (Example 19) using the same Cr/silica-titania catalyst (3.0% Ti) as was used in Example 18. In this case, 500 lbs of the catalyst were again charged to the same commercial activator vessel at 600° F. The catalyst was then heated up to 1250° F. in air at the rate of 2.7° F./min and a gas velocity of 2.4 ft/sec. The catalyst was held at this temperature for 8 hours, and then cooled in air to 600° F. at 150° F./h. After purging in nitrogen at this temperature for 3 hours, it was discharged into a storage vessel under nitrogen. A sample of this catalyst was then taken and tested for polymerization behavior. The results are again shown in Table 7, along with the reference catalyst 8B, which is a laboratory activation of catalyst A, that is, using the catalyst A control Example 8B shown in Table 5. Note that the HLMI and MI from the Invention runs 18-1 and 18-2 were considerably higher than those from the control run 19 and the reference run 8B.

Example 20

Still another commercial run was made with 500 lbs of Catalyst A (3.2% Ti) in Example 20. The catalyst was again charged under nitrogen at 600° F. and then it was heated under 0.24 ft/sec nitrogen flow at a ramp rate of 2.7° F./min to 700° F. The conditioning procedure used in Example 18 was repeated in this Example. That is, 3-minute bursts of 50% air were applied, resulting in an exotherm of initially 45° F., followed by a 10–15 min cool-down in pure nitrogen. The second cycle produced a 40° F. temperature rise. Seven cycles in all were conducted, each time the exotherm decreasing by a few degrees. On the seventh cycle the temperature rose 20° F. and then started to cool before the air was removed. Then the atmosphere was changed back to pure nitrogen, and the bed was heated up at 2.7° F./min to 1250° F. (677° C.), where the bed was held for 6 hours. Next the bed was cooled in nitrogen at 7° F./min to 1067° F. (575° C.), and the atmosphere was changed to pure air. An exotherm to 1126° F. occurred in the next 5 minutes, after which the temperature was lowered to 1022° F. in a controlled drop taking 51 min for an average drop rate of about 0.8° F./min during this period. The cool-down rate was then changed to 6.9° F./min. The atmosphere was changed back to pure nitrogen when the temperature reached 600° F. Thus, for the entire oxidation period using the "moving" oxidation step, temperatures X° F. to Y° F. as explained herein were X=1067° F. and Y=700° F., taking 1.98 hours, giving an average drop rate of 3.6° F./min. A sample of catalyst was taken for testing and the results are also shown in Table 7. Notice again that the melt index and HLMI obtained are considerably higher than the control runs.

Examples 21-29

As set out in Example 18, a sample was taken which designated Sample 18A, after the initial steps of the activation, but before the final oxidation step. In the following experiments, small portions of that Sample 18A were then oxidized in air (0.05 ft/sec) for 30 minutes at various temperatures from 650° C. to 400° C. This Sample 18A catalyst activated under different oxidation conditions was then subject to polymerization testing, the results of which are shown in Table 8. All of these tests produced polymers having melt index and HLMI values substantially higher than the control runs 8A and 8B (see Table 5). It also can be observed that at the lowest temperatures the catalyst was not oxidized enough to obtain the best activity, suggesting that longer oxidation times were needed in these runs.

TABLE 8

| Example | 21 | 22 | 23 | 24 | 25 | 26 | 27 | 28 | 29 |
| --- | --- | --- | --- | --- | --- | --- | --- | --- | --- |
| Catalyst | 18A | 18A | 18A | 18A | 18A | 18A | 18A | 18A | 18A |
| | | | | Oxidation treatment | | | | | |
| Air temp. ° C. | 650 | 650 | 600 | 550 | 500 | 450 | 450 | 400 | 400 |
| Air time | 30 min | 30 min | 30 min | 30 min | 30 min | 30 min | 30 min | 30 min | 30 min |
| Productivity, g/g | 3106 | 2766 | 2704 | 2814 | 2843 | 1706 | 2578 | 1630 | 1296 |
| Activity, g/g-h | 4546 | 2862 | 2496 | 2345 | 2472 | 806 | 1011 | 906 | 1450 |
| HLMI, dg/min | 65.5 | 65.9 | 86.1 | 72.7 | 39.7 | 131 | 42.6 | 84.8 | 73.3 |
| M1, dg/min | 0.89 | 0.99 | 1.35 | 1.12 | 0.55 | 2.2 | 0.51 | 1.20 | 1.05 |
| HLMI/MI | 73 | 67 | 64 | 65 | 72 | 60 | 83 | 71 | 70 |
| Wt % Cr(VI) | 0.58 | 0.58 | 0.56 | 0.49 | 0.46 | 0.42 | 0.42 | 0.32 | 0.32 |

Example 30

In this example, a low-Ti version of the Cr/titania-coated silica catalyst was activated according to this disclosure by first calcining in nitrogen at 675° C. ($T^1$) for a relatively short 4 hours ($t^{H1}$), followed by either one of two different oxidative atmosphere activation steps or processes: [1] in method A, the catalyst was oxidized in air for 30 min at 650° C. to provide Catalyst A; and [2] in method B, the catalyst was oxidized in air for 30 min at 450° C. to provide Catalyst B. Catalyst A was found to produce a polyethylene having an HLMI of 65–66 g/10 min, and although Catalyst B had considerably lower activity as Catalyst A, Catalyst B was found to produce a polyethylene having an HLMI of 138 g/10 min.

The invention is described above with reference to numerous aspects and embodiments, and specific examples. Many variations will suggest themselves to those skilled in the art in light of the above detailed description. All such obvious variations are within the full intended scope of the appended claims. Other aspects of the invention can include, but are not limited to, the following aspects. Many aspects are described as "comprising" certain components or steps, but alternatively, can "consist essentially of" or "consist of" those components or steps unless specifically stated otherwise.

Aspect 1. A process for activating a supported chromium catalyst, the process comprising:
 a) heating a supported chromium catalyst in an inert atmosphere to a first temperature ($T^1$) at a first ramp rate ($RR^1$);

b) holding the chromium catalyst at the first temperature in the inert atmosphere for a first hold time ($t^{H1}$);

c) allowing the chromium catalyst to attain a second temperature ($T^2$) in the inert atmosphere at a second ramp rate ($RR^2$), followed by exposing the chromium catalyst to an oxidative atmosphere;

d) holding the chromium catalyst at the second temperature in the oxidative atmosphere for a second hold time ($t^{H2}$); and e) allowing the chromium catalyst to cool to a temperature below the second temperature in an inert atmosphere, in the oxidative atmosphere, or in any sequential combination of an inert atmosphere and an oxidative atmosphere over a cooling time ($t^C$), to provide an activated chromium catalyst.

Aspect 2. A process according to Aspect 1, wherein step e) comprises exposing the chromium catalyst to an inert atmosphere or an oxidative atmosphere while allowing the chromium catalyst to cool to a temperature less than about 250° C., less than about 240° C., less than about 230° C., less than about 220° C., less than about 210° C., less than about 205° C., less than about 204° C., less than about 200° C., less than about 190° C., less than about 180° C., less than about 170° C., less than about 160° C., less than about 150° C., less than about 140° C., less than about 130° C., less than about 120° C., less than about 110° C., or less than about 100° C. over the cooling time ($t^C$), to provide the activated chromium catalyst, wherein the lower limit of the temperature in each occurrence is about ambient temperature.

Aspect 3. A process according to Aspect 1, wherein step e) comprises exposing the chromium catalyst to an inert atmosphere while allowing the chromium catalyst to cool over the cooling time ($t^C$), to provide the activated chromium catalyst.

Aspect 4. A process according to Aspect 1, wherein step e) comprises allowing the chromium catalyst to cool in the oxidative atmosphere over the cooling time ($t^C$), to provide the activated chromium catalyst.

Aspect 5. A process according to Aspect 1, wherein step e) comprises allowing the chromium catalyst to cool in the inert atmosphere followed by an oxidative atmosphere over the cooling time ($t^C$), to provide the activated chromium catalyst.

Aspect 6. A process according to Aspect 1, wherein step e) comprises allowing the chromium catalyst to cool in the oxidative atmosphere followed by an inert atmosphere over the cooling time ($t^C$), to provide the activated chromium catalyst.

Aspect 7. A process according to Aspect 1, wherein step e) comprises allowing the chromium catalyst to cool in the inert atmosphere, followed by an oxidative atmosphere, followed by an inert atmosphere over the cooling time ($t^C$), to provide the activated chromium catalyst.

Aspect 8. A process according to any one of Aspects 1-7, wherein the oxidative atmosphere is a mixture of 50% oxygen and 50% nitrogen.

Aspect 9. A process according to any one of Aspects 1-7, wherein the oxidative atmosphere is air.

Aspect 10. A process according to any one of Aspects 1-7, wherein the first temperature ($T^1$) is greater than the second temperature ($T^2$) ($T^2$ is less than $T^1$).

Aspect 11. A process according to any one of Aspects 1-7, wherein the first temperature ($T^1$) is equal to the second temperature ($T^2$).

Aspect 12. A process according to any one of Aspects 1-7, wherein the first temperature ($T^1$) is greater than the second temperature ($T^2$), and the step of allowing the chromium catalyst to attain the second temperature ($T^2$) in the inert atmosphere comprises cooling the chromium catalyst under a flow of inert gas.

Aspect 13. A process according to any one of Aspects 1-12 wherein the inert atmosphere comprises nitrogen or argon.

Aspect 14. A process according to any one of Aspects 1-12, wherein the inert gas used in each step is nitrogen.

Aspect 15. A process according to any one of Aspects 1-14, wherein the oxidative atmosphere comprises air or oxygen.

Aspect 16. A process according to any one of Aspects 1-14, wherein the oxidative atmosphere comprises air or oxygen having a dew point of less than about –40° C., less than about –50° C., less than about –60° C., less than about –70° C., or less than about –80° C., for example about –82° C. (–116° F.).

Aspect 17. A process according to any one of Aspects 1-16, wherein $T^1$ is from about 500° C. to about 1000° C., from about 550° C. to about 900° C., from about 600° C. to about 870° C., or from about 650° C. to about 850° C.

Aspect 18. A process according to any one of Aspects 1-16, wherein $T^1$ is about 500° C., about 525° C., about 550° C., about 575° C., about 600° C., about 625° C., about 650° C., about 675° C., about 700° C., about 725° C., about 750° C., about 775° C., about 800° C., about 825° C., about 850° C., about 875° C., about 900° C., about 925° C., about 950° C., about 975° C., or about 1000° C.

Aspect 19. A process according to any one of Aspects 1-18, wherein the first ramp rate ($RR^1$) is greater than about 1° C./minute, greater than about 1.35° C./minute, greater than about 1.5° C./minute, or greater than about 1.8° C./minute, and wherein the upper limit of the first ramp rate in each occurrence is about 5° C./minute.

Aspect 20. A process according to any one of Aspects 1-18, wherein the first ramp rate ($RR^1$) is about 1° C./minute, about 1.25° C./minute, about 1.35° C./minute, about 1.5° C./minute, about 1.8° C./minute, or about 2° C./minute.

Aspect 21. A process according to any one of Aspects 1-20, wherein the first hold time ($t^{H1}$) is less than about 15 hours, less than about 10 hours, less than about 6 hours, less than about 5 hours, less than about 4 hours, or less than about 3 hours, and wherein the lower limit of $t^{H1}$ in each occurrence is about 15 minutes.

Aspect 22. A process according to any one of Aspects 1-20, wherein the first hold time ($t^{H1}$) is about 15 hours, about 12 hours, about 10 hours, about 6 hours, about 5 hours, about 4 hours, about 3 hours, or about 2 hours.

Aspect 23. A process according to any one of Aspects 1-22, wherein $T^2$ (° C.)=$T^1$ (° C.)–K (° C.), and wherein K is selected from about 0° C., about 25° C., about 50° C., about 100° C., about 150° C., or about 200° C.

Aspect 24. A process according to any one of Aspects 1-22, wherein $T^2$ (° C.)=$T^1$ (° C.)–K (° C.), and wherein K is selected from greater than 25° C., greater than 50° C., greater than 100° C., greater than 150° C., or greater than 200° C., and wherein the upper limit of K is each occurrence is about 500° C.

Aspect 25. A process according to any one of Aspects 1-24, wherein the second hold time ($t^{H2}$) is less than 1 hour, less than 30 minutes, less than 15 minutes, less than 10 minutes, less than 5 minutes, or less than 1 minute, and wherein the lower limit of $t^{H2}$ in each occurrence is about 30 seconds.

Aspect 26. A process according to any one of Aspects 1-24, wherein the second hold time ($t^{H2}$) is about 1 hour, about 45 minutes, about 30 minutes, about 15 minutes, about 10 minutes, about 5 minutes, about 2 minutes, or about 30 seconds.

Aspect 27. A process according to any one of Aspects 1-26, wherein the chromium catalyst is allowed to cool for a cooling time ($t^C$) of less than 4 hours, less than 3.5 hours, less than 3 hours, less than 1 hour, less than 30 minutes, or less than 5 minutes, and wherein the lower limit of $t^C$ in each occurrence is about 30 seconds.

Aspect 28. A process according to any one of Aspects 1-26, wherein the chromium catalyst is allowed to cool for a cooling time ($t^C$) of about 4 hours, about 3.5 hours, about 3 hours, about 2.5 hour, about 2 hour, about 1.5 hour, about 1 hour, about 45 minutes, about 30 minutes, about 15 minutes, about 10 minutes, about 5 minutes, or about 1 minute.

Aspect 29. A process according to any one of Aspects 1-28, wherein the activated chromium catalyst comprises, by weight, less than 0.6% Cr(VI), less than 0.5% Cr(VI), less than 0.4% Cr(VI), less than 0.3% Cr(VI), less than 0.2% Cr(VI), less than 0.1% Cr(VI), or less than 0.05% Cr(VI), and wherein the lower limit of the activated chromium catalyst by weight in each occurrence is about 0.01% Cr(VI).

Aspect 30. A process according to any one of Aspects 1-28, wherein the activated chromium catalyst comprises, by weight, about 0.6% Cr(VI), about 0.5% Cr(VI), about 0.4% Cr(VI), about 0.3% Cr(VI), about 0.2% Cr(VI), about 0.1% Cr(VI), or about 0.05% Cr(VI).

Aspect 31. A process according to any one of Aspects 1-30, wherein the process is carried out over a time period of less than 16 hours, less than 15 hours, less than 14 hours, less than 13 hours, less than 12 hours, less than 11 hours, or less than 10 hours, and wherein the lower limit of the time period in each occurrence is about 4 hours.

Aspect 32. A process according to any one of Aspects 1-30, wherein the process is carried out over a time period of about 16 hours, about 15 hours, about 14 hours, about 13 hours, about 12 hours, about 11 hours, about 10 hours, about 9 hours, or about 8 hours.

Aspect 33. A process according to any one of Aspects 1-32, wherein the process is carried out with at least 500 pounds of supported chromium catalyst.

Aspect 34. A process according to any one of Aspects 1-32, wherein the supported chromium catalyst is a Cr/silica catalyst or a Cr/titania-coated silica catalyst.

Aspect 35. A process according to any one of Aspects 1-34, wherein the process is carried out in a fluidized bed.

Aspect 36. A process according to any one of Aspects 1-35, wherein step a) of heating the supported chromium catalyst to the first temperature ($T^1$) is preceded by a conditioning process, the conditioning process comprising heating the supported chromium catalyst to a conditioning temperature ($T^C$) in an oxidative atmosphere at a conditioning ramp rate ($RR^C$), and holding the chromium catalyst at $T^C$ in the oxidative atmosphere for a conditioning time ($t^C$) to provide a conditioned chromium catalyst.

Aspect 37. A process according to any one of Aspects 1-35, wherein step a) of heating the supported chromium catalyst to the first temperature ($T^1$) is preceded by a conditioning process, the conditioning process comprising:
 a) heating the supported chromium catalyst to a conditioning temperature ($T^C$) in an inert atmosphere at a conditioning ramp rate ($RR^C$), and holding the chromium catalyst at $T^C$ in the inert atmosphere for a first conditioning time ($t^{C1}$);
 b) exposing the supported chromium catalyst to an oxidative atmosphere for a second conditioning time ($t^{C2}$);
 c) exposing the supported chromium catalyst to an inert atmosphere for a third conditioning time ($t^{C3}$); and
 d) repeating steps b) and c) between 0 and 15 times to provide a conditioned chromium catalyst.

Aspect 38. A process according to Aspect 37, wherein steps b) and c) are repeated between 2 and 10 times.

Aspect 39. A process according to Aspect 37, wherein steps b) and c) are repeated between 3 and 8 times.

Aspect 40. A process according to any one of Aspects 36-39, wherein the conditioning temperature ($T^C$) is from about 200° C. to about 425° C., from about 250° C. to about 400° C., or from about 300° C. to about 375° C.

Aspect 41. A process according to any one of Aspects 36-39, wherein the conditioning temperature ($T^C$) is about 200° C., about 225° C., about 250° C., about 275° C., about 300° C., about 325° C., about 350° C., about 375° C., about 400° C., about 425° C., or about 450° C.

Aspect 42. A process according to any one of Aspects 36-41, wherein the oxidative atmosphere comprises air or oxygen.

Aspect 43. A process according to any one of Aspects 36-41, wherein the oxidative atmosphere comprises air or oxygen having a dew point of less than about −40° C., less than about −50° C., less than about −60° C., less than about −70° C., or less than about −80° C., for example about −82° C. (−116° F.).

Aspect 44. A process according to any one of Aspects 36-43, wherein following the conditioning process, the conditioned chromium catalyst is exposed to an inert atmosphere.

Aspect 45. A process according to any one of Aspects 36-44, wherein the process is carried out in a fluidized bed.

Aspect 46. A process according to any one of Aspects 1-45, wherein step a) through step e) are carried out in a common heating zone.

Aspect 47. A process according to any one of Aspects 1-45, wherein step a) through step e) are carried out in at least two different heating zones.

Aspect 48. A process according to any one of Aspects 1-47, wherein the process for activating a supported chromium catalyst is carried out in a batch mode.

Aspect 49. A process according to any one of Aspects 1-47, wherein the process for activating a supported chromium catalyst is carried out in a continuous mode.

Aspect 50. A supported chromium catalyst prepared according the process of any one of Aspects 1-49.

Aspect 51. A supported chromium catalyst prepared according the process of any one of Aspects 1-49, wherein the supported chromium catalyst is a Cr/silica catalyst or a Cr/titania-coated silica catalyst.

Aspect 52. A supported Cr/titania-coated silica catalyst prepared according to the process of any one of Aspects 1-49, wherein:
 a) the activated chromium catalyst comprises less than 0.5% Cr(VI) by weight; and
 b) under polymerization conditions, the activated chromium catalyst is contacted in a reaction zone with at least one $C_2$ to $C_8$ mono-1-olefin to form an olefin polymer having a melt index (MI) greater than the MI calculated from the following equation:

$$MI > 8 \times [0.00050124 \exp(0.00830795 \cdot T)] \times [0.0994(PV)^3 - 0.7843(PV)^2 + 2.0147(PV) - 0.8824] \times [-0.6102(Ti)^3 + 1.2715(Ti)^2 + 0.003(Ti) + 0.2];$$

wherein T (° C.) is the average temperature used under polymerization conditions, PV (cc/g) is the pore volume of the activated chromium catalyst, and Ti (atoms/nm$^2$) is the titanium concentration in the activated chromium catalyst.

Aspect 53. A supported Cr/titania-coated silica catalyst prepared according to the process of any one of Aspects 1-49, wherein:
a) the activated chromium catalyst comprises less than 0.5% Cr(VI) by weight; and
b) under polymerization conditions, the activated chromium catalyst is contacted in a reaction zone with at least one $C_2$ to $C_8$ mono-1-olefin to form an olefin polymer having a melt index (MI) greater than the MI calculated from the following equation:

$$MI>4.8\times[0.0994(PV)^3-0.7843(PV)^2+2.0474(PV)-0.8824]-[-0.6102(Ti)^3+1.2715(Ti)^2+0.003(Ti)+0.2];$$

wherein PV (cc/g) is the pore volume of the activated chromium catalyst, and Ti (atoms/nm$^2$) is the titanium concentration in the activated chromium catalyst.

Aspect 54. A supported Cr/titania-coated silica catalyst prepared according to the process of any one of Aspects 52 or 53, wherein:
PV (pore volume) is in a range of from about 0.3 mL/g (cc/g) to about 5.0 mL/g, from about 0.4 mL/g to about 4.5 mL/g, from about 0.5 mL/g to about 4.0 mL/g, from about 0.5 mL/g to about 3.5 mL/g, from about 0.5 mL/g to about 3.0 mL/g, from about 0.5 mL/g to about 2.5 mL/g, from about 0.7 mL/g to about 2.3 mL/g, from about 1.0 mL/g to about 2.2 mL/g, from about 1.2 mL/g to about 2.0 mL/g, or from about 1.4 mL/g to about 1.7 mL/g; and
Ti concentration is in a range of from about 0 atoms/nm$^2$ to about 5 atoms/nm$^2$, from about 0 atoms/nm$^2$ to about 4.5 atoms/nm$^2$, from about 0 atoms/nm$^2$ to about 4.0 atoms/nm$^2$, from about 0 atoms/nm$^2$ to about 3.5 atoms/nm$^2$, or from about 0 atoms/nm$^2$ to about 3.0 atoms/nm$^2$.

Aspect 55. A process for polymerizing olefins using a supported chromium catalyst, the process comprising:
a) activating the supported chromium catalyst according to the process of any one of Aspects 1-49 to provide the activated chromium catalyst; and
b) under polymerization conditions, contacting in a reaction zone the activated chromium catalyst with at least one $C_2$ to $C_8$ mono-1-olefin to form an olefin polymer.

Aspect 56. A process according to Aspect 55, wherein the at least one $C_2$ to $C_8$ mono-1-olefin comprises ethylene.

Aspect 57. A process according to Aspect 55, wherein the at least one $C_2$ to $C_8$ mono-1-olefin comprises ethylene and at least one $C_3$ to $C_8$ mono-1-olefin comonomer.

Aspect 58. A process according to Aspect 55, wherein the at least one $C_2$ to $C_8$ mono-1-olefin comprises ethylene and at least one of propylene, 1-butene, 1-hexene, or 1-octene.

Aspect 59. A process according to any one of Aspects 55-58, wherein the activated chromium catalyst is a Cr/silica catalyst and comprises, by weight, less than 0.5% Cr(VI), and wherein the olefin polymer is characterized by a high load melt index (HLMI, g/10 min) of greater than 100 g/10 min.

Aspect 60. A process according to any one of Aspects 55-58, wherein the activated chromium catalyst comprises, by weight, less than 0.4% Cr(VI), and wherein the olefin polymer is characterized by a high load melt index (HLMI, g/10 min) of greater than 100 g/10 min.

Aspect 61. A process for polymerizing olefins according to any one of Aspects 55-60, wherein
a) the olefin polymer has a melt index (MI) greater than the melt index (MI$^R$) of a reference polyolefin; and
b) wherein the reference polyolefin is prepared under identical conditions as the olefin polymer, with the exception that a reference chromium catalyst is used in preparing the reference polyolefin, which is activated by:
i) heating the supported chromium catalyst in air to an activation temperature T$^1$, for example from 600° C. to 1000° C., and holding the chromium catalyst at the activation temperature in air for 3 hours; and
ii) allowing the chromium catalyst to cool below the activation temperature in air to provide the activated reference chromium catalyst.

Aspect 62. A process for polymerizing olefins according to Aspect 61, wherein the olefin polymer has a melt index (MI, g/10 min) at least 25% greater, at least 50% greater, at least 100% greater, at least 200% greater, at least 300% greater, or at least 500% greater than the MI of the reference polyolefin, and wherein the upper limit of the melt index of the olefin polymer is about 1000% greater than the MI of the reference polyolefin.

Aspect 63. A process for polymerizing olefins according to any one of Aspects 61-62, wherein the activation time of the activated chromium catalyst is about 80%, about 70%, about 60%, about 50%, or about 40% of the activated reference chromium catalyst.

Aspect 64. A process for polymerizing olefins according to any one of Aspects 61-63, wherein the melt index (MI) of the olefin polymer is about 10° F., about 20° F., about 30° F., about 40° F., about 50° F., about 60° F., about 70° F., about 80° F., about 90° F., or about 100° F. greater than the melt index (MI$^R$) of the reference polyolefin.

Aspect 65. A process for polymerizing olefins according to any one of Aspects 61-64, wherein the olefin polymer has a broader molecular weight distribution based upon Mw/Mn, Mz/Mn, or any appropriate ratio of Mn, Mw, Mx. Mv, or M(z+n) as compared to the reference polyolefin.

Aspect 66. A process for polymerizing olefins according to any one of Aspects 61-65, wherein the olefin polymer has a lower long chain branching (LCB) content as compared to the reference polyolefin.

The following references may provide background information or other information related to the various aspects or embodiments of this disclosure, and each of these references is incorporated herein by reference.

1. M. P. McDaniel, M. B. Welch, J. Catal. 82 (1983) 110.
2. (a) M. P. McDaniel, M. B. Welch, J. Catal., 82 (1983) 98. (b) in: F. E. Bailey Jr. (Ed.), Initiation of Polymerization, A.C.S. Symposium Series 212, A.C.S. Symposium, Las Vegas, 1983, pp. 191-206 Paper 15. (c) Org. Coat. Appl. Polym. Sci. Proc., 46 (1981) 708-713.
3. M. P. McDaniel, Transition Metal Catalyzed Polymerizations, in: R. P. Quirk (Ed.), Alkenes and Dienes, vol. 4, MMI Press, Midland, MI, 1983, p. 713, Part B.
4. Hawley, G. R. and McDaniel, M. P., U.S. Pat. No. 4,333,860, issued Jun. 8, 1982, 1983, and U.S. Pat. No. 4,368,301, issued Jan. 11, both to Phillips Petroleum Co.
5. Delap, J. A., U.S. Pat. No. 3,976,632 issued Aug. 24, 1976, to Phillips Petroleum Co.
6. Nasser, B. E. and Delap, J. A., U.S. Pat. No. 4,188,471 issued Feb. 12, 1980, to Phillips Petroleum Co.
7. Witt, D. R., U.S. Pat. No. 4,001,196 issued Jan. 4, 1977, to Phillips Petroleum Co.

8. M. P. McDaniel, U.S. Pat. No. 4,489,172 issued Dec. 18, 1984, and U.S. Pat. No. 4,559,394 issued Dec. 17, 1985, both to Phillips Petroleum Co.

9. A. Clark, J. P. Hogan, R. L. Banks, W. C. Lanning, Ind. Eng. Chem. 48 (1956) 1152.

10. E. Garrone, G. Ghiotti, A. Zecchina, NATO ASI Ser., Ser. C 326 (1990) 393-406, (Olefin Metathesis Polym. Catal.).

11. McDaniel, M. P. and Welch, M. B., U.S. Pat. No. 4,177,162 issued Dec. 4, 1979, and U.S. Pat. No. 4,277,587 issued Jul. 7, 1981, both to Phillips Petroleum Co.

12. McDaniel, M. P., U.S. Pat. No. 4,248,735 issued Feb. 3, 1981, and U.S. Pat. No. 4,297,460 issued Oct. 27, 1981, both to Phillips Petroleum Co.

13. M. P. McDaniel, J. Phys. Chem. 85 (1981) 532.

14. McDaniel, M. P., J. Phys. Chem. 85 (1981) 537.

15. McDaniel, M. P., U.S. Pat. No. 4,308,172 issued Dec. 29, 1981, and U.S. Pat. No. 4,357,451 issued Nov. 2, 1982, both to Phillips Petroleum Co.

16. L. M. Baker, W. L. Carrick, J. Org. Chem. 35 (1970) 775.

17. Noshay, A. and Karol, F. J., "Chemical activation of silica supports for chromocene-based polyethylene catalysts" in Transition Metal Catalyzed Polymerization, Proc. Int. Symp., 2nd, held in Akron, OH in 1986, (Quirk, R. P.) Cambridge Univ. Press, Cambridge, 396-416, 1988.

18. Pullukat, T. J., Hoff, R. E. and Shida, M., J. Appl. Polym. Sci., 26, 2927 (1981).

19. McDaniel, M. P. and Welch, M. B., U.S. Pat. No. 4,151,122 issued Apr. 24, 1979, and U.S. Pat. No. 4,182,815 issued Jan. 8, 1980, both to Phillips Petroleum Co.

20. McDaniel, M. P., Sanbrano, J. A. and Johnson, M. M., U.S. Pat. No. 4,397,769 issued Aug. 9, 1983, and U.S. Pat. No. 4,460,756 issued Jul. 17, 1984, both to Phillips Petroleum Co.

21. McDaniel, M. P. and Welch, M. B., U.S. Pat. No. 4,247,421 issued Jan. 27, 1981 to Phillips Petroleum Co.

22. R. L. Burwell, G. L. Haller, K. C. Taylor, J. F. Read, Adv. Catal. 20 (1969) 1.

23. D. Cornet, R. L. Burwell, J. Am. Chem. Soc. 90 (1968) 2489.

24. McDaniel, M. P. and Burwell, R. L., J. Catal., 36, 394 (1975).

25. McDaniel, M. P. and Burwell, R. L., J. Catal., 36, 404 (1975).

26. Mangnus, P. J., Ellison, A., Scheffer, B. and Moulijn, J. A., Bull. Soc. Chim. Belg., 96, 977 (1987).

27. Hawley, G. R., U.S. Pat. No. 4,295,998, issued Oct. 20, 1981, and U.S. Pat. No. 4,331,789, issued May 25, 1982, both to Phillips Petroleum Co.

28. M. P. McDaniel, K. S. Collins, E. A. Benham, Journal of Catalysis, 252 (2007) 281-295.

We claim:

1. A process for preparing a supported chromium catalyst, the process comprising:
   (a) calcining a silicon oxide at a first temperature to provide a calcined silicon oxide comprising siloxane moieties, wherein the first temperature is above 600° C.;
   (b) contacting the calcined silicon oxide with a chromium composition comprising a chromium source in an anhydrous, aprotic solvent, to form a chromium-treated silicon oxide comprising a residual solvent, the chromium source comprising a compound of chromium (VI); and
   (c) heating the chromium-treated silicon oxide to a second temperature to remove the residual solvent and form the supported chromium catalyst, wherein the second temperature is less than the first temperature.

2. The process of claim 1, wherein the chromium source comprises $CrO_3$, bis(t-butyl)chromate, bis(triphenylsilyl) chromate, diarenechromium(0), chromium tris(acetylacetonate), or $CrCl_3$.

3. The process of claim 2, wherein the chromium composition comprises $CrO_3$ dissolved in acetonitrile.

4. The process of claim 1, wherein the supported chromium catalyst comprises, by weight, less than 0.6% Cr(VI).

5. The process of claim 1, wherein the silicon oxide comprises silica, silica-alumina, silica-titania, titania-coated silica, or a combination thereof.

6. The process of claim 1, wherein the anhydrous, aprotic solvent comprises acetonitrile, pentane, heptane, dry ether, toluene, a crown ether, or tetrahydrofuran.

7. The process of claim 1, wherein the first temperature is greater than 800° C.

8. The process of claim 1, wherein the calcining step is carried out for up to 3 hours.

9. The process of claim 1, wherein the calcined silicon oxide is substantially dehydroxylated as compared to the silicon oxide prior to being calcined.

10. The process of claim 1, wherein the second temperature is greater than or equal to 150° C.

11. The process of claim 1, wherein the chromium-treated silicon oxide is heated to the second temperature for a duration of up to 1 hour.

12. The process of claim 11, wherein heating the chromium-treated silicon oxide to the second temperature further fixes the chromium to the silicon oxide.

13. The process of claim 1, wherein during at least a portion of the calcining step, calcining the silicon oxide is carried out in the presence of a dehydroxylation promoter to substantially dehydroxylate the silicon oxide and form the siloxane moieties.

14. The process of claim 1, wherein at least a portion of the siloxanes are strained siloxanes.

15. A supported chromium catalyst prepared according the process of claim 1.

16. The supported chromium catalyst of claim 15, having a catalyst activity of greater than 2 kg $g^{-1}$ $h^{-1}$, greater than 4 kg $g^{-1}$ $h^{-1}$, greater than 6 kg $g^{-1}$ $h^{-1}$, or greater than 8 kg $g^{-1}$ $h^{-1}$.

17. A process for polymerizing olefins using a supported chromium catalyst, the process comprising:
   preparing the supported chromium catalyst according to the process of claim 1; and
   under polymerization conditions, contacting in a reaction zone the supported chromium catalyst with at least one $C_2$ to $C_8$ mono-1-olefin to form an olefin polymer.

18. The process of claim 17, wherein the at least one $C_2$ to $C_8$ mono-1-olefin comprises ethylene and at least one $C_3$ to $C_8$ mono-1-olefin comonomer.

19. The process of claim 17, wherein:
   the olefin polymer has a melt index (MI) greater than about 10, greater than about 30, or greater than about 50, or greater than about 70.

20. The process of claim 17, wherein the olefin polymer has a lower long chain branching (LCB) content as compared to a reference polyolefin prepared by an analogous process using a supported chromium catalyst prepared under non-anhydrous conditions.

21. The process of claim 17, wherein the olefin polymer has a broader molecular weight distribution (MWD) as compared to a reference polyolefin prepared by an analogous process using a supported chromium catalyst prepared under non-anhydrous conditions.

* * * * *